(12) United States Patent
Jacobs et al.

(10) Patent No.: US 7,580,085 B2
(45) Date of Patent: Aug. 25, 2009

(54) OPTICAL DEVICE AND DISPLAY OPERATING IN TWO DIMENSIONAL AND AUTOSTEREOSCOPIC THREE DIMENSIONAL MODES

(75) Inventors: Adrian Marc Simon Jacobs, Littlemore (GB); Martin David Tillin, Abingdon (GB); David James Montgomery, Bampton (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/519,264

(22) PCT Filed: Jun. 19, 2003

(86) PCT No.: PCT/JP03/07834

§ 371 (c)(1),
(2), (4) Date: Aug. 26, 2005

(87) PCT Pub. No.: WO2004/003630

PCT Pub. Date: Jan. 8, 2004

(65) Prior Publication Data

US 2006/0082702 A1   Apr. 20, 2006

(30) Foreign Application Priority Data

Jun. 28, 2002   (GB) .................................. 0215059.7

(51) Int. Cl.
G02F 1/1335   (2006.01)
G02F 1/1333   (2006.01)

(52) U.S. Cl. ............................ 349/15; 349/96; 349/117

(58) Field of Classification Search .................. 349/96, 349/15, 117
See application file for complete search history.

(56) References Cited

U.S. PATENT DOCUMENTS

| 5,548,427 | A | * | 8/1996 | May .............................. 349/117 |
| 5,894,361 | A | * | 4/1999 | Yamazaki et al. .............. 349/15 |
| 6,046,787 | A | * | 4/2000 | Nishiguchi .................... 349/129 |
| 7,002,642 | B2 | * | 2/2006 | Jung .............................. 349/15 |

FOREIGN PATENT DOCUMENTS

| EP | 0 887 666 A2 | 12/1998 |
| EP | 0 887 666 A3 | 1/1999 |
| EP | 0 919 847 A2 | 6/1999 |
| GB | 2 317 295 A | 3/1998 |

OTHER PUBLICATIONS

International Search Report for corresponding PCT/JP03/07834, mailed Oct. 17, 2003.

* cited by examiner

Primary Examiner—David Nelms
Assistant Examiner—Nathanael R Briggs
(74) Attorney, Agent, or Firm—Renner, Otto, Boisselle & Sklar, LLP

(57) ABSTRACT

An optical device comprises an input polarizer 4, a patterned retarder 5 and an output polarizer 12. The retarder 5 has regions 8 and 9, at least one of which alters the polarization of light from the input polarizer 4. The output polarizer 7 has a transmission axis 12 such that light passing through the regions 8 and 9 of the retarder 5 and through the output polarizer 7 is matched in amplitude, phase and polarization. Such a device may be used as a switchable parallax barrier with an LCD 2 to provide a display which is switchable between an autostereoscopic 3D mode and a 2D mode with the 2D mode having more uniform intensity across the display.

41 Claims, 26 Drawing Sheets

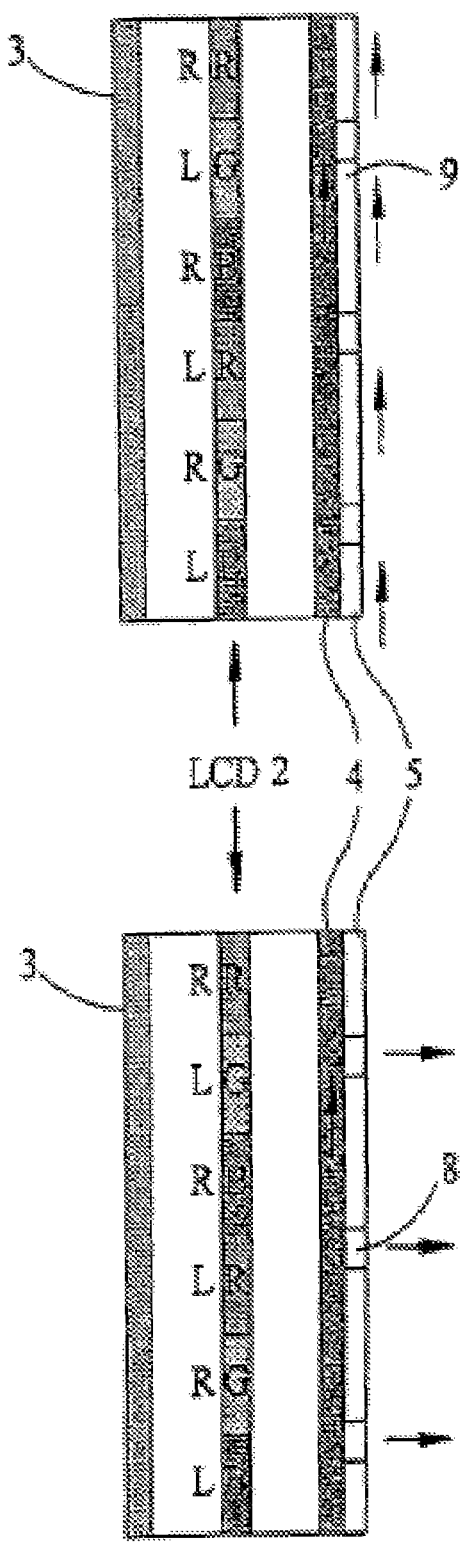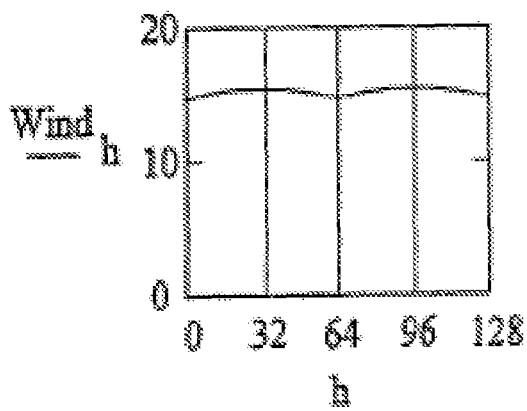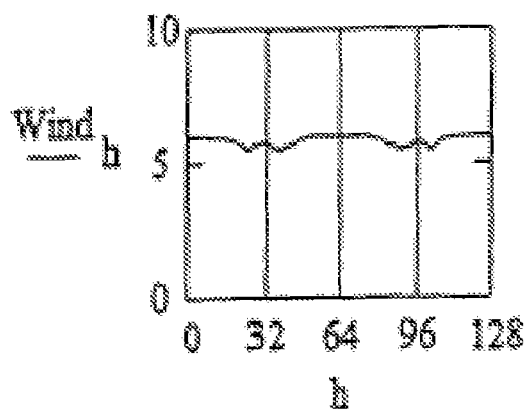
Pitch = 0.091
FIG 4  Prior Art

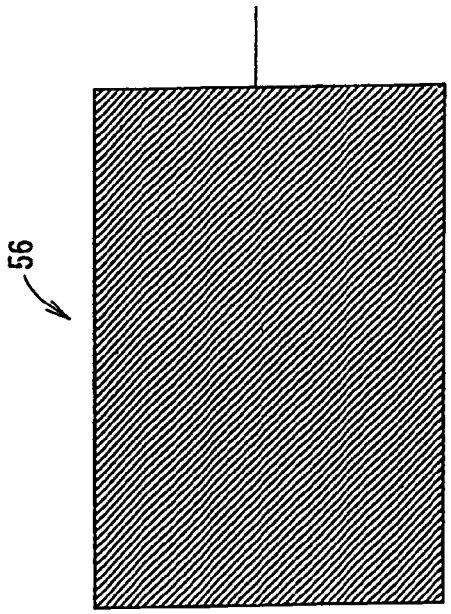
Electrode pattern for switch cell Substrate 1
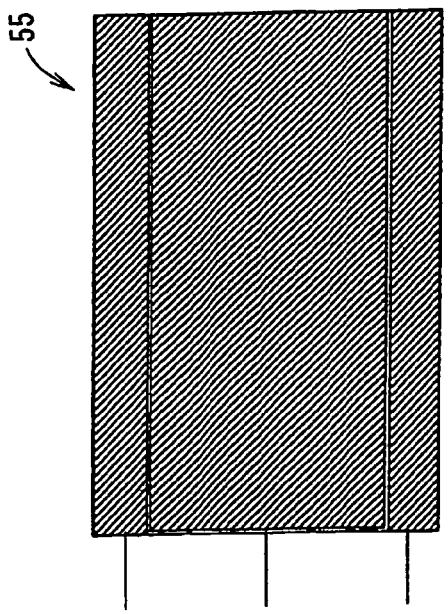
Electrode pattern for switch cell Substrate 2
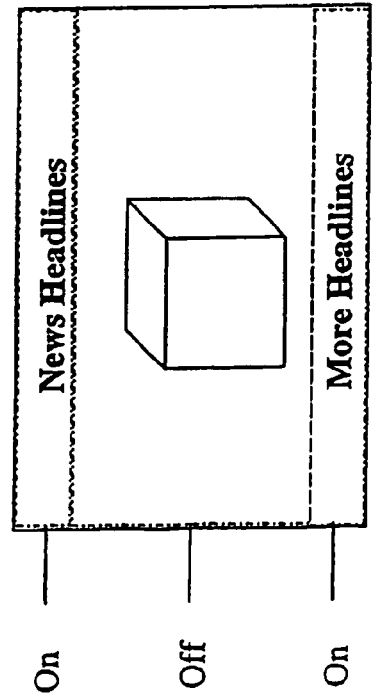
What is seen on the display (dashed line indicates different regions)
FIG 26

OPTICAL DEVICE AND DISPLAY OPERATING IN TWO DIMENSIONAL AND AUTOSTEREOSCOPIC THREE DIMENSIONAL MODES

TECHNICAL FIELD

The present invention relates to an optical device which may, for example, be used in a display capable of operating in two dimensional (2D) and autostereoscopic three dimensional (3D) modes. The present invention also relates to displays incorporating such optical devices.

BACKGROUND ART

GB 2 317 295 and EP 0 829 744 discloses a display which may be operated in 2D and 3D modes. FIG. 1 of the accompanying drawings illustrates the basic structure of one example of such a display in the 2D and 3D modes. In the 3D mode, the display comprises a compact extended backlight 1 disposed behind a spatial light modulator (SLM) embodied as a liquid crystal device (LCD) 2. The LCD 2 has a rear polariser 3 and a front polariser 4. In the 3D mode, the display is of the front parallax barrier type in which the parallax barrier is formed by a patterned retarder 5 formed on a substrate 6 and a polariser 7.

In the 2D mode also illustrated in FIG. 1, the polariser 7 is removed so that the parallax barrier is effectively disabled.

FIG. 2 of the accompanying drawings illustrates operation in the 3D mode. The retarder 5 comprises regions such as 8, which rotate the polarisation direction of light passing therethrough by 90°, and regions such as 9, which do not alter the polarisation of light passing therethrough. The regions 8 correspond to the slits of the parallax barrier whereas the regions 9 correspond to the opaque barrier portions between the slits.

In FIG. 2, polarisation directions in the plane of the drawing are represented by double-headed arrows whereas polarisation directions perpendicular to the plane of the drawing are represented by filled circles. Unpolarised light from the backlight 1 is incident on the input polariser 3, which substantially blocks the polarisation component perpendicular to the plane of the drawing and has a transmission axis 10 which passes the polarisation component in the plane of the drawing. The LCD 2 is of a type which is controlled so as to vary the polarisation rotation through the device with 90° rotation corresponding to maximum brightness. The transmission axis 11 of the output polariser 4 is orthogonal to the transmission axis 10 of the input polariser 3 so that the output polariser 4 transmits only light polarised perpendicular to the plane of the drawing.

Light from the output polariser 4 passing through the regions 9 has its polarisation unchanged. The polariser 7 has a transmission axis 12 which is orthogonal to the transmission axis 11 of the polariser 4 so that light passing through the regions 9 is substantially blocked and the regions 9 appear dark or opaque. Light passing through the regions 8 has its polarisation direction rotated by 90° so as to be parallel to the transmission axis 12 of the polariser 7. The polariser 7 thus transmits this light so that the combination of the patterned retarder 5 and the polariser 7 acts as a parallax barrier. In the 2D mode of the display, the polariser 7 is moved or removed so as to be out of the light path from the display to an observer. The barrier structure is thus no longer visible and light from both the regions 8 and the regions 9 is transmitted to an observer.

FIG. 3 of the accompanying drawings illustrates the appearance of the parallax barrier in the 3D mode at 15 and also illustrates the pixellated structure of the display. The LCD 2 comprises red (R), green (G) and blue (B) picture elements (pixels) arranged as rows and columns. Images for viewing by left and right eyes of an observer are arranged as interleaved columns (LR) of pixels and cooperate with the slit regions 8 of the retarder 5 to form viewing windows 16 in a plane spaced from the front of the display by the preferred viewing distance. Ideally, the light transmission profile for each window should be a "top hat" function with constant light intensity inside the window and zero light intensity outside the window. However, as shown at 18 in FIG. 3, there is some intensity variation across each window and non-zero intensity outside each window resulting in cross-talk between left and right images.

In the 2D mode of operation as shown in FIG. 4, light from the "black" regions of the retarder 5 is vertically polarised whereas that from the "slit" regions 8 is horizontally polarised. This results in different intensity distributions in the viewing plane because of the two polarisations, which sum together because they are orthogonal and do not interfere. Where the patterned retarder 5 is embodied as a patterned halfwave plate with the optic axis of each slit region 8 being oriented differently from the optic axis of each black region 9, light passing through the black regions 9 encounters only a single refractive index because of the retarder slow axis whereas light passing through the regions 8 encounters both the fast and slow axes of the retarder and thus passes through a different optical path. When a polariser is placed in the path, the polarisations are made the same and the light paths are able to interfere. However, in general, there is a relative phase shift between the paths and so adding the amplituders (rather than the intensities) does not cancel out the variation. This results in a variation in brightness in the 2D mode across the display and is undesirable.

FIG. 5 of the accompanying drawings illustrates the 2D mode of a 2D/3D display of the type disclosed in GB 2 236 728 and EP 0 887 666. The display of FIG. 5 differs from that shown in FIG. 2 in that, instead of being removed for the 2D mode, the polariser 7 is arranged with its transmission axis 12 at −45° to the transmission axis 11 of the polariser 4.

The lower part of FIG. 5 illustrates the effect of the display on the light wavefront in the 2D mode. The regions 9 have their slow axis aligned with the polarisation direction of light from the polariser 4 so that, as shown at 20, light from the regions 9 has a uniform wavefront. The polarisation direction of light passing through the regions 8 is rotated by 90° and experiences both the fast and slow axes of the regions 8. This is illustrated at 21.

The polariser 7 is oriented to pass light from the regions 8 and 9. In particular, the polariser 7 passes a portion of the light from the regions 9, which light has experienced only the slow axis of the retarder 5. However, the polariser 7 passes light from the regions 8, which light has experienced both the fast and slow axes. The polariser 7 therefore transmits a non-uniform wavefront as illustrated at 22 and, as described hereinbefore, this gives rise to non-uniform window illumination in the 2D mode.

DISCLOSURE OF THE INVENTION

According to a first aspect of the invention, there is provided an optical device comprising an input polariser for passing light having a first polarisation direction, a polarisation modifying element for receiving light of the first polarisation direction from the input polariser, and an output polariser for analysing light from the polarisation modifying element, the polarisation modifying element comprising at least first and second sets of regions, the or each region of the first set changing the polarisation of light from the input polariser to a second polarisation direction different from the first polarisation direction and the or each region of the second set supplying light of a third polarisation direction different from the second polarisation direction, the output polariser cooperating with the polarisation modifying element such that each first light path through the or each region of the first set and the output polariser has substantially the same attenuation and phase change to light from the input polariser as each second light path through the or each region of the second set and the output polariser.

The regions of the first and second sets may be interleaved and may comprise first and second parallel strips, respectively. The first strips may have a first width and the second strips may have a second width greater than the first width.

The second and third polarisation directions may be substantially orthogonal.

The third polarisation direction may be the same as the first polarisation direction.

The device may have an alternative mode of operation in which the output polariser is arranged to pass light from the regions of one of the first and second sets and to attenuate light from the regions of the other of the first and second sets. The one of the first and second sets may be the first set. The output polariser may be arranged substantially to block light from the other of the first and second sets in the alternative mode.

The polarisation modifying element may comprise a patterned retarder and the output polariser may be arranged to transmit the same proportions of slow and fast axis components of light from the first and second sets of regions. The output polariser may be arranged to transmit only the slow axis component of light from the first and second sets of regions. The retarder may comprise a photo-polymerised polymer. The retarder may provide a halfwave of retardation at a visible light frequency. The slow axis of the or each region of the first set may be oriented at 45° to the first polarisation direction and the slow axis of the or each region of the second set may be parallel to the first polarisation direction. The output polariser may transmit light having a polarisation direction oriented at 45° to the first polarisation direction. The output polariser may be reorientable for the alternative mode so as to transmit light having a polarisation direction substantially orthogonal to the first polarisation direction.

The slow axis of the or each region of the first set may be oriented at 22.5° to the first polarisation direction and the slow axis of the or each region of the second set may be oriented at −22.5° to the first polarisation direction.

The slow axis of the or each region of the first set may be parallel to the first polarisation direction and the slow axis of the or each region of the second set may be oriented at 45° to the first polarisation direction.

The device may comprise a further polarisation modifying element between the input and output polarisers. The further element may be a further retarder. The further retarder may provide a halfwave of retardation at a visible light frequency. The further retarder may be a liquid crystal device.

The further retarder may have a slow axis oriented at 22.5° to the first polarisation direction. The output polariser may transmit light having a polarisation direction parallel to the first polarisation direction. The further retarder and the output polariser may be rotatable as a unit through 180° about an axis parallel to the slow axis of the or each region of the first set for the alternative mode.

The further retarder may comprise at least one region whose slow axis is switchable between a first orientation substantially parallel to the first and second light paths and a second orientation substantially perpendicular to the first orientation. The further retarder may be a Freedericksz cell.

The first orientation may be for the alternative mode, the second orientation may be oriented at 22.5° to the first polarisation direction, and the output polariser may transmit light having a polarisation direction perpendicular to the first polarisation direction.

The second orientation may be for the alternative mode and may be oriented at 67.5° to the first polarisation direction and the output polariser may transmit light having a polarisation direction perpendicular to the first polarisation direction.

The second orientation may be for the alternative mode and may be oriented at 22.5° to the first polarisation direction and the output polariser may transmit light having a polarisation direction oriented at 45° to the first polarisation direction.

The further retarder may comprise at least one region whose slow axis is switchable between third and fourth orientations substantially perpendicular to the first and second light paths. The third orientation may be perpendicular to the first polarisation direction and the fourth orientation may be for the alternative mode and may be oriented at 67.5° to the first polarisation direction.

The further element may comprise a polarisation rotator. The rotator may comprise at least one region which provides a polarisation rotation of 45°. The rotator may comprise a twisted nematic liquid crystal device.

The liquid crystal device may have an alignment direction, at a liquid crystal surface nearer the input polariser, parallel to the first polarisation direction and alignment direction, at a liquid crystal surface nearer the output polariser, oriented at 45° to the first polarisation direction.

The liquid crystal device may have an alignment direction, at a liquid crystal surface nearer the input polariser, oriented at 22.5° to the first polarisation direction and an alignment direction, at a liquid crystal surface nearer the output polariser, oriented at 112.5° to the first polarisation direction.

The liquid crystal device may have an alignment direction, at a liquid crystal surface nearer the input polariser, oriented at 12.5° to the first polarisation direction and an alignment direction, at a liquid crystal surface nearer the output polariser, oriented at 102.5° to the first polarisation direction.

The polarisation rotator may be disableable for the alternative mode.

According to a second aspect of the invention, there is provided a display comprising a device according to the first aspect of the invention.

The display may comprise a spatial light modulator, such as a liquid crystal spatial light modulator.

The display may have an autostereoscopic mode. The device, when in the alternative mode, may form a front or rear parallax barrier.

Throughout the present specification, positive values of angles may be either clockwise or anticlockwise, with negative values then referring to angles in the opposite direction. Also, all angles of polarisation directions and retarder slow axes are expressed "modulo 180°". Thus, each angle $\theta$ is equivalent to each angle $(\theta+n\cdot 180)°$, where n is any integer. However, in the cases of certain devices, because of the nature of their constructions, a value of $\theta$ may be preferred over the value $(\theta+180°)$ because of improved performance.

It is thus possible to provide an optical device which is suitable for use in displays. When used, for example, in an autostereoscopic 3D display which also has a 2D mode of operation, such a device substantially reduces or suppresses variations in light intensity across the display in the 2D mode. For example, where the device operates as a parallax barrier in the 3D mode, faint intensity strips, (corresponding to the barrier or slit regions in the 3D mode) are substantially suppressed in the 2D mode so that, as compared with known types of displays, this visual artefact can be removed or reduced to the point where it is not visible to an observer.

Various embodiments permit changes in mode of operation by turning the device around or by totally electronic means. No part of the display need be removed so that there is no need to provide any storage arrangement or complex alignment arrangement for moveable parts. In the case of rotatable parts, alignment with the display can be achieved very easily. Fine resolution electrode patterns for switchable liquid crystal elements are not required. Similarly, sub-pixel alignment of liquid crystal elements to a spatial light modulator is not required.

Achromaticity of bright and dark states can be improved. This results in reduced crosstalk in the 3D mode of operation.

BRIEF DESCRIPTION OF THE DRAWINGS

The invention will be further described, by way of example, with reference to the accompanying drawings, in which:

FIG. 4 shows cross sectional views of the display of FIG. 1 in the 2D mode illustrating variations in brightness;

FIG. 26 illustrates electrode patterns for a switching LCD and an example of the appearance of a display incorporating such an LCD.

Like reference numerals refer to like parts throughout the drawings.

BEST MODE FOR CARRYING OUT THE INVENTION

Hereinafter, the present invention will be described by way of examples with reference to the drawings.

Figure 1:
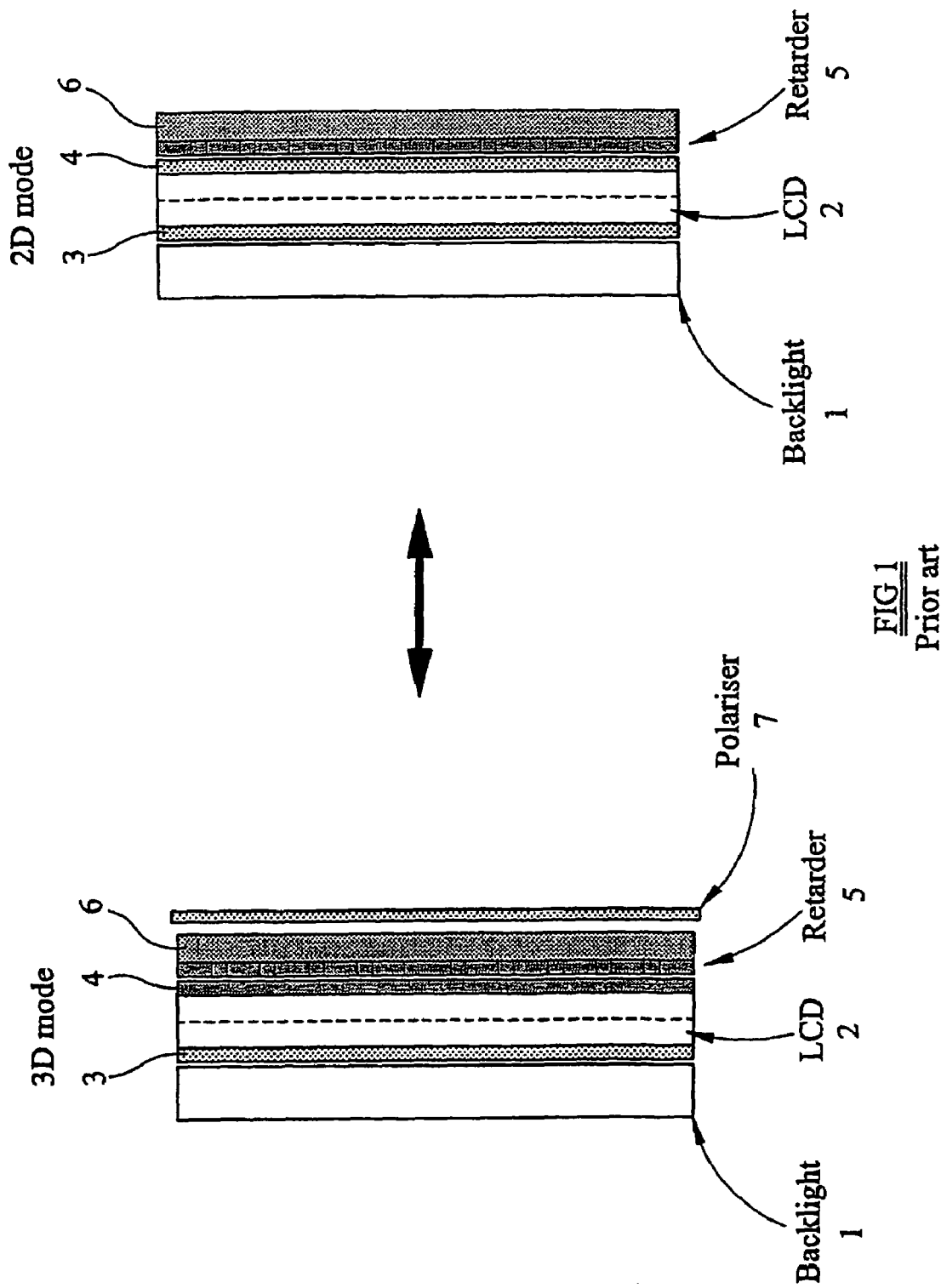
FIG. 1 is a cross sectional diagrammatic view of a known type of display in 3D and 2D modes of operation.
Figure 2:
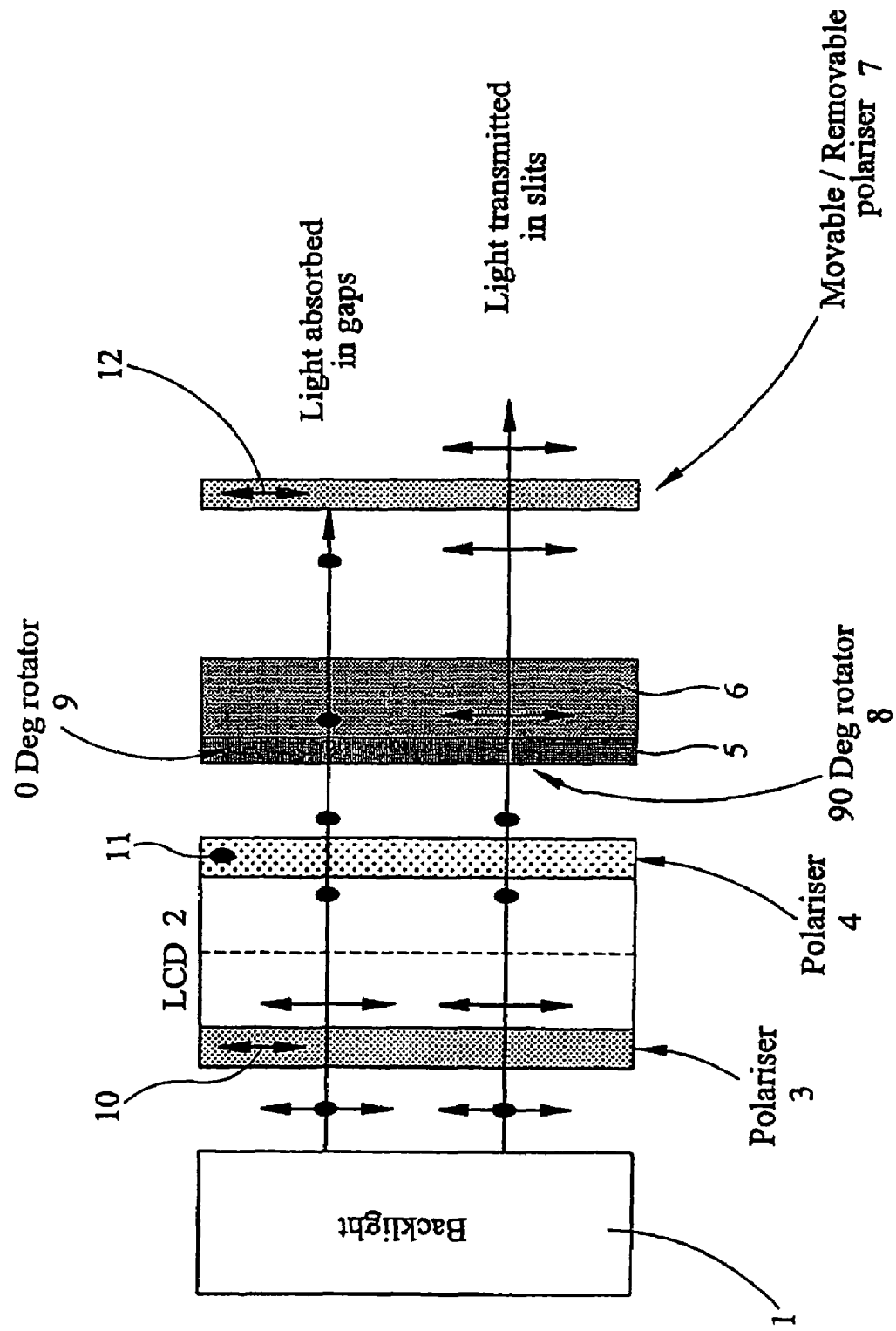
FIG. 2 is a cross sectional diagram of the display of FIG. 1 illustrating the 3D mode of operation.
Figure 3:
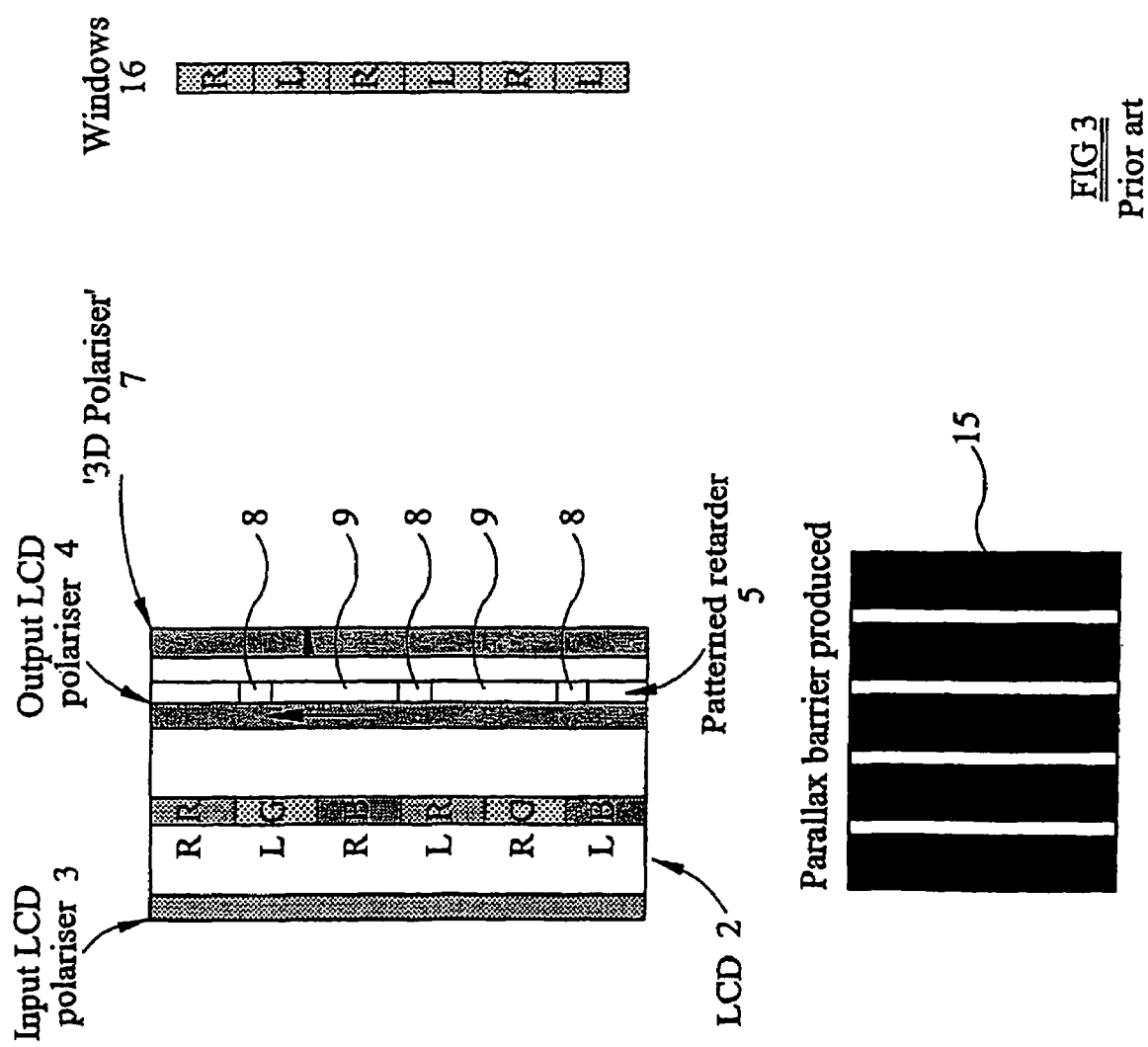
FIG. 3 is a cross sectional diagrammatical view of the display of FIG. 1 in the 3D mode.
Figure 5:
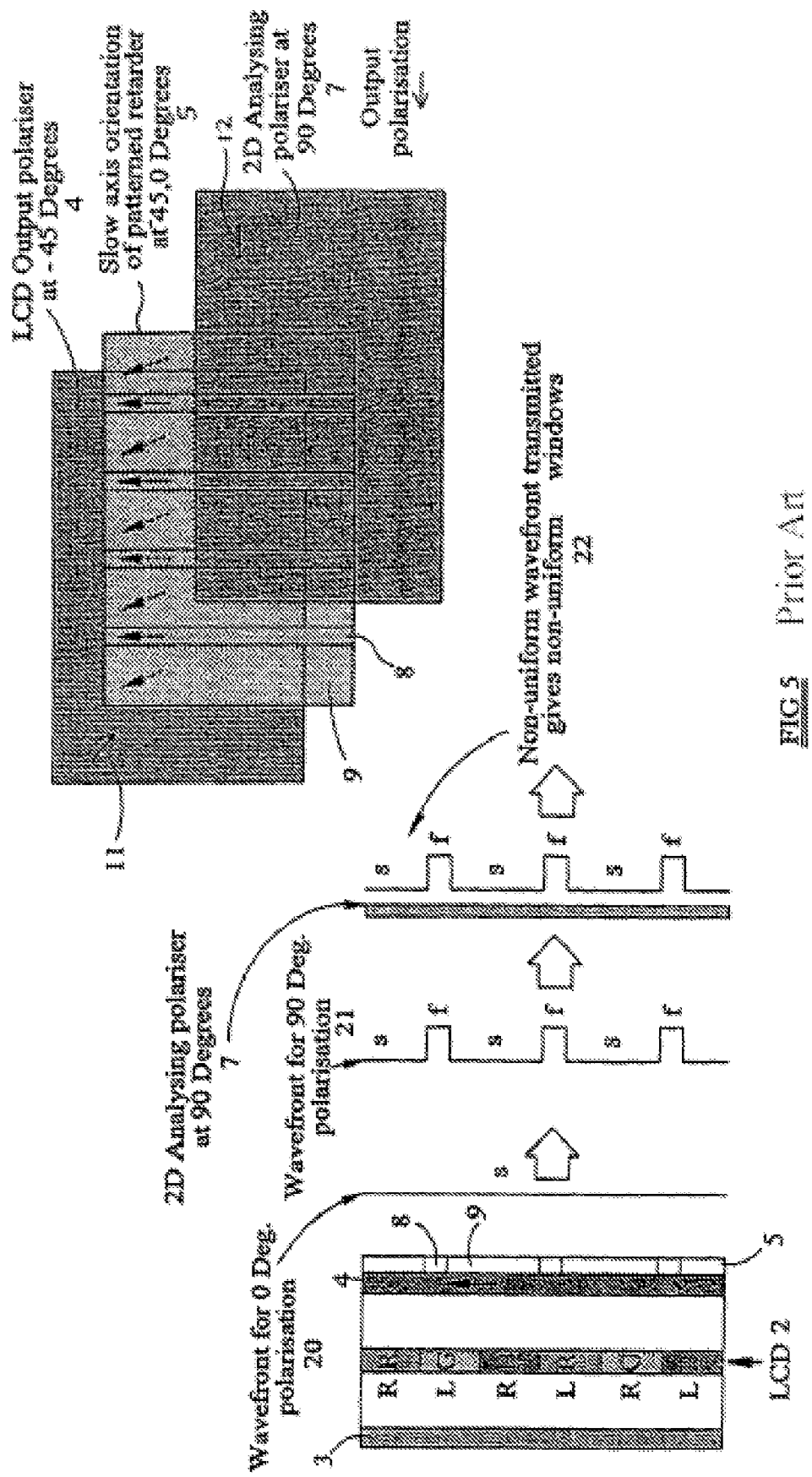
FIG. 5 is a diagrammatic illustration of another known type of display illustrating the mechanism whereby brightness variations occur across the display in a 2D mode.
Figure 6:
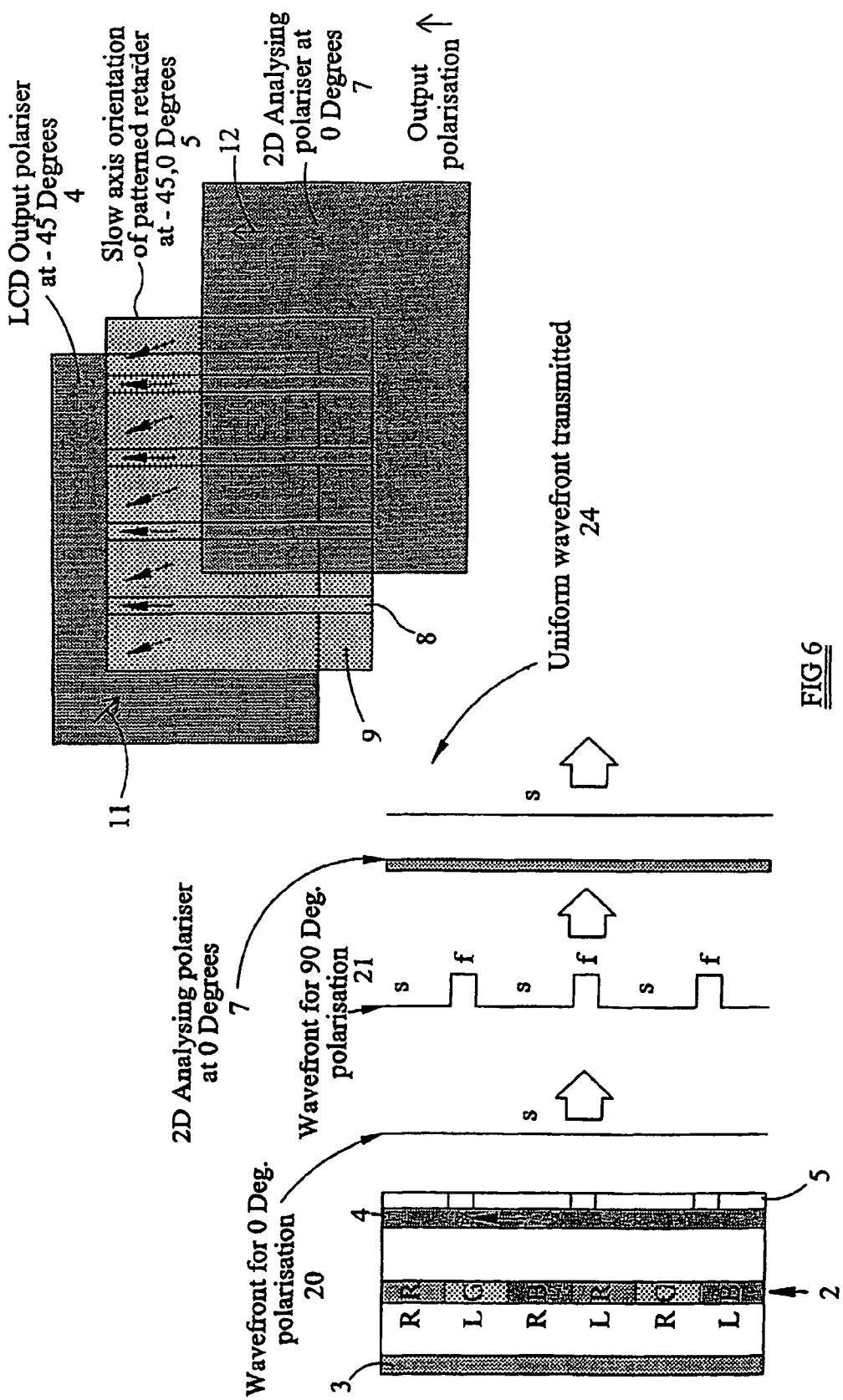
FIG. 6 is a diagram illustrating an optical device formed as part of a display constituting a first embodiment of the invention.

FIG. 6 illustrates an optical device constituting an embodiment of the invention and forming part of an autostereoscopic display, also constituting an embodiment of the invention and having an autostereoscopic 3D mode of operation and a 2D mode of operation. The 2D mode of operation is illustrated in FIG. 6 and, in this mode, the device and display of FIG. 6 differ from that of FIG. 5 in that the transmission axis 12 of the output polariser 7 is oriented at 45° to the transmission axis 11 of the polariser 4, which comprises an output polariser of a liquid crystal display (LCD) 2 forming a spatial light modulator.

Because liquid crystal devices are typically arranged with the transmission axis 11 of their output polarisers at −45° to the image vertical of the image displayed by such devices, this is the orientation which is illustrated in FIG. 6 and the other drawings. Thus, all angles are referred to the vertical in the drawings and hence the transmission direction 11 of the polariser 4 is indicated as being oriented at −45°. The slow axes of the regions 8 are thus oriented at 0° whereas the slow axes of the regions 9 are oriented at −45° The transmission axis 12 of the output polariser 7 is oriented at 0°.

As shown in the lower part of FIG. 6 and as previously described with reference to FIG. 5, light polarised in the direction of the transmission axis 11 of the polariser 4 experiences only the slow axis of the regions 9 and thus has a uniform wavefront as shown at 20. Light passing through the regions 8 experiences both the fast and slow axes of the regions 8 as illustrated at 21. Light "f" which has experienced the fast axis has a wavefront which is ahead of light "s" which has experienced the slow axis of the patterned retarder 5. However, the transmission axis 12 of the output polariser 7 is oriented, in the 2D mode of operation, to transmit only light from the regions 8 and 9 which has experienced the slow axis; light which has experienced the fast axis is effectively extinguished by the output polariser 7. Thus, as illustrated at 24, light from the whole area of the display has a substantially uniform wavefront so that variations in intensity across the display resulting from the patterning of the retarder 5 are substantially eliminated or reduced in level to the point where undesirable visual artefacts are substantially imperceptible to an observer of the display.

In the embodiment illustrated in FIG. 6, light passing through the regions 9 only experiences the slow axis. However, in other embodiments where light passing through each of the regions 8 and 9 experiences the fast and slow axis, the output polariser 7 may be arranged to pass equal proportions of the fast and slow axis components from each of the regions 8 and 9 so that the output light has a uniform wavefront. Similarly, the orientations are such that light from the regions 8 and 9 experiences the same degree of attenuation. Thus, each light path through the device exhibits the same attenuation and phase performance for both the regions 8 and 9.

In order to operate the display shown in FIG. 6 in the autostereoscopic 3D mode, an output polariser having a transmission axis oriented at 45°, ie perpendicular to the transmission axis 11 of the LCD output polariser 4, is required. When viewed through such a polariser, light from the regions 9 is substantially extinguished so that these regions appear opaque whereas light is transmitted through the regions 8, which thus effectively form slits of a parallax barrier. In order to change between the 3D and 2D modes of operation, interchangeable polarisers 7 may be provided or the polariser 7 may be arranged to rotate.

Figure 7:
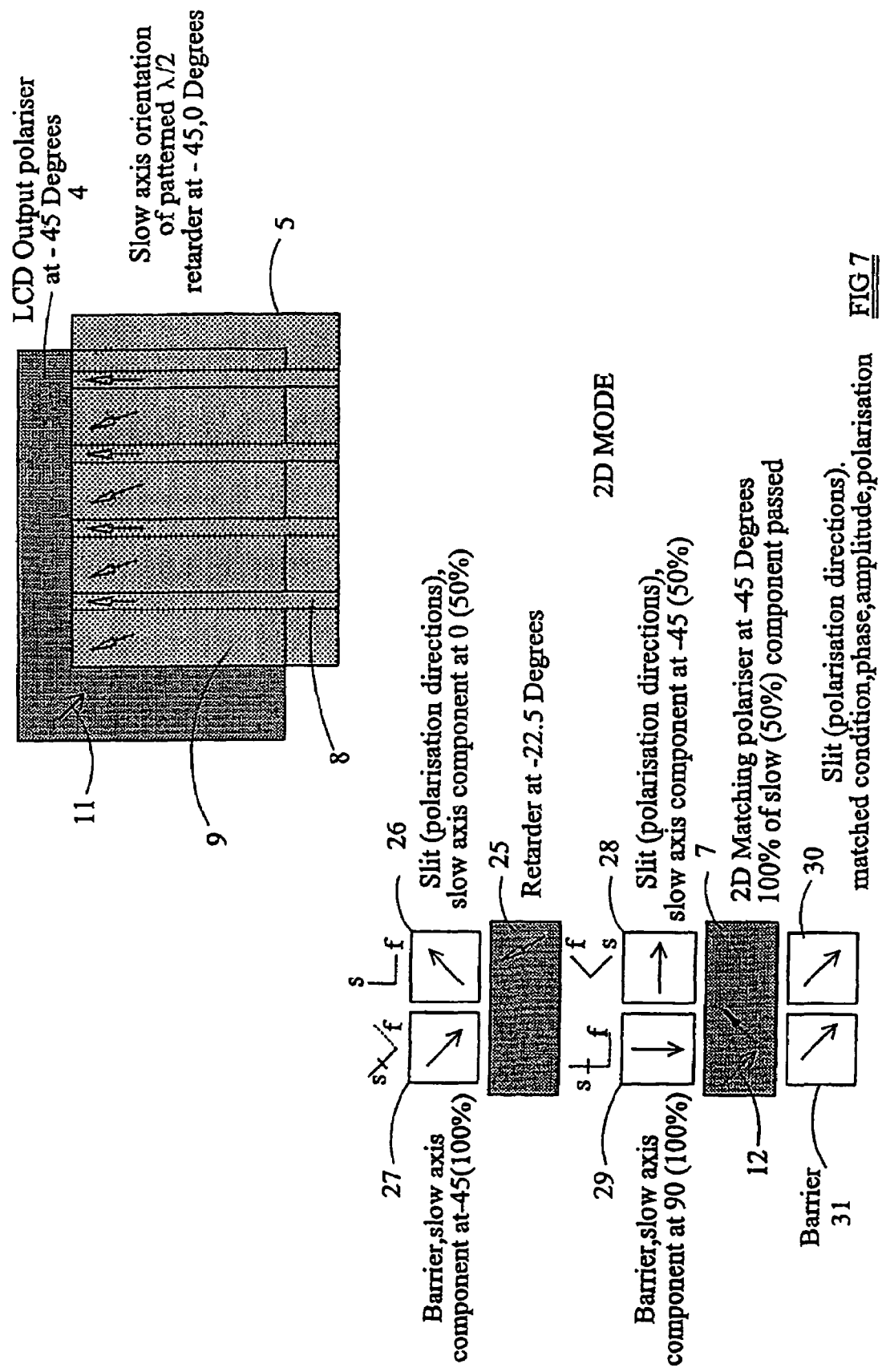
FIG. 7 illustrates diagrammatically an optical device and display constituting a second embodiment of the invention.

FIG. 7 illustrates an optical device and autostereoscopic 3D/2D display constituting another embodiment of the invention. The device shown in FIG. 7 differs from that shown in FIG. 6 in that a further halfwave retarder 25 is disposed between the patterned retarder 5 and the output polariser 7 and the transmission axis 12 of the output polariser 7 is oriented at −45° for the 2D mode of operation. The retarder 25 is a uniform sheet retarder with its slow axis oriented at −22.5°.

The polarisation directions of light passing through the regions 8 and 9 are illustrated at 26 and 27, respectively. After passing through the retarder 25, the polarisations of light from the regions 8 and 9 are rotated as shown at 28 and 29, respectively. As in the previous embodiment, the polariser 7 passes only light affected by the slow axis so that output light 30 and 31 from the slit regions 8 and the barrier regions 9, respectively, is matched in phase, amplitude and polarisation.

Figure 8:
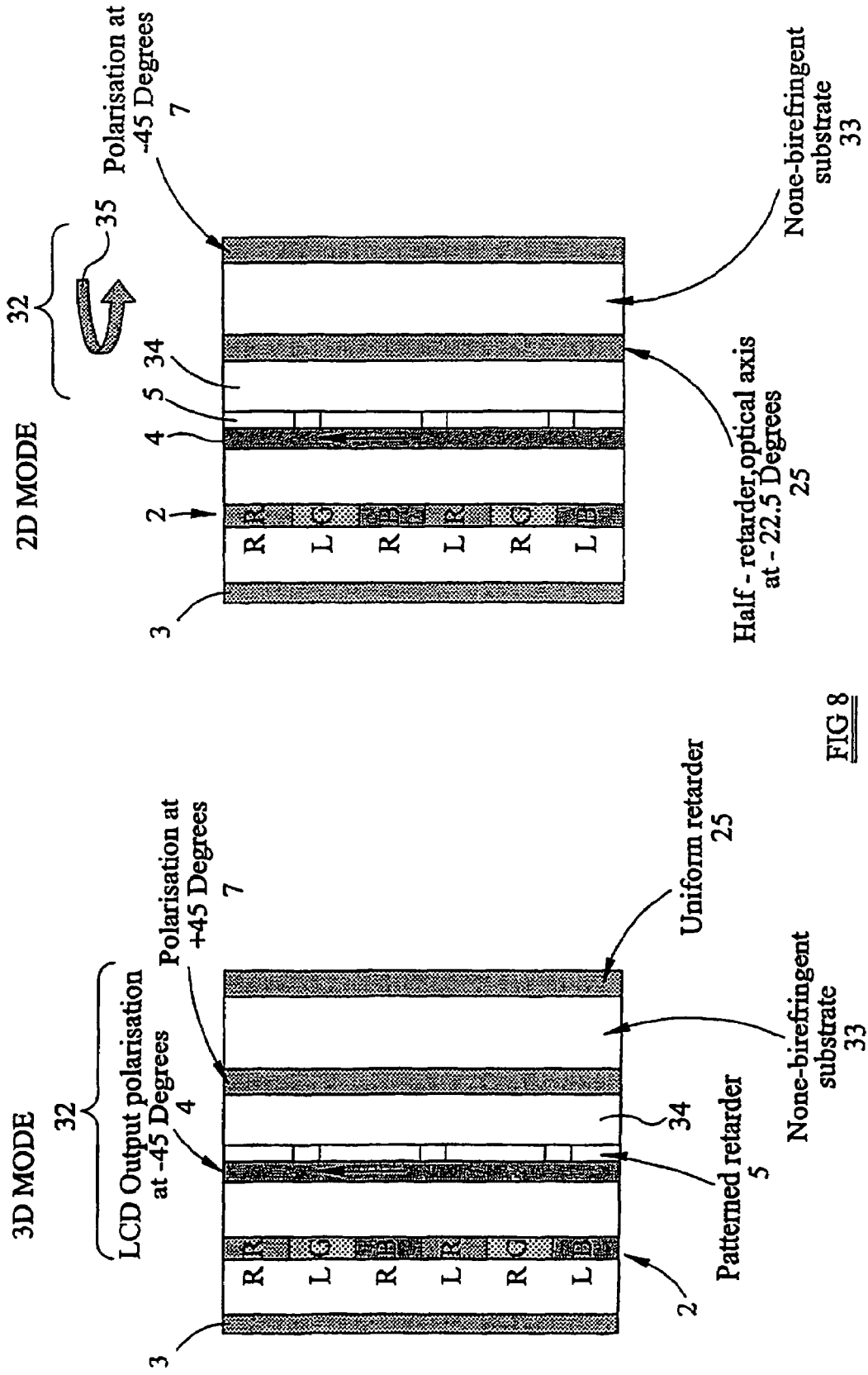
FIG. 8 is a cross sectional diagrammatic view illustrating different physical arrangements of the display of FIG. 7.

In the 3D mode of operation, the retarder 25 is unnecessary and the transmission axis 12 of the output polariser 7 is required to be at 45°. This may conveniently be achieved by forming the retarder and the polariser 7 as an integral element 32 as illustrated in FIG. 8. The polariser 7 and the retarder 25 are formed on opposite sides of a non-birefringent substrate 33 whereas the patterned retarder 5 is formed on one side of a non-birefringent substrate 34. The 2D configuration is illustrated at the right in FIG. 8 whereas the 3D configuration is illustrated at the left. In the 3D mode, the polariser 7 is disposed between the patterned retarder 5 and the uniform retarder 25 so that the uniform retarder 25 has substantially no effect and is substantially invisible to an observer. Switching between the modes may be achieved by rotating the substrate 33 carrying the polariser 7 and the retarder 25 through 180° about a vertical axis as illustrated by the arrow 35. There is therefore no need to provide additional storage because the whole of the display is always "in use".

Figure 9:
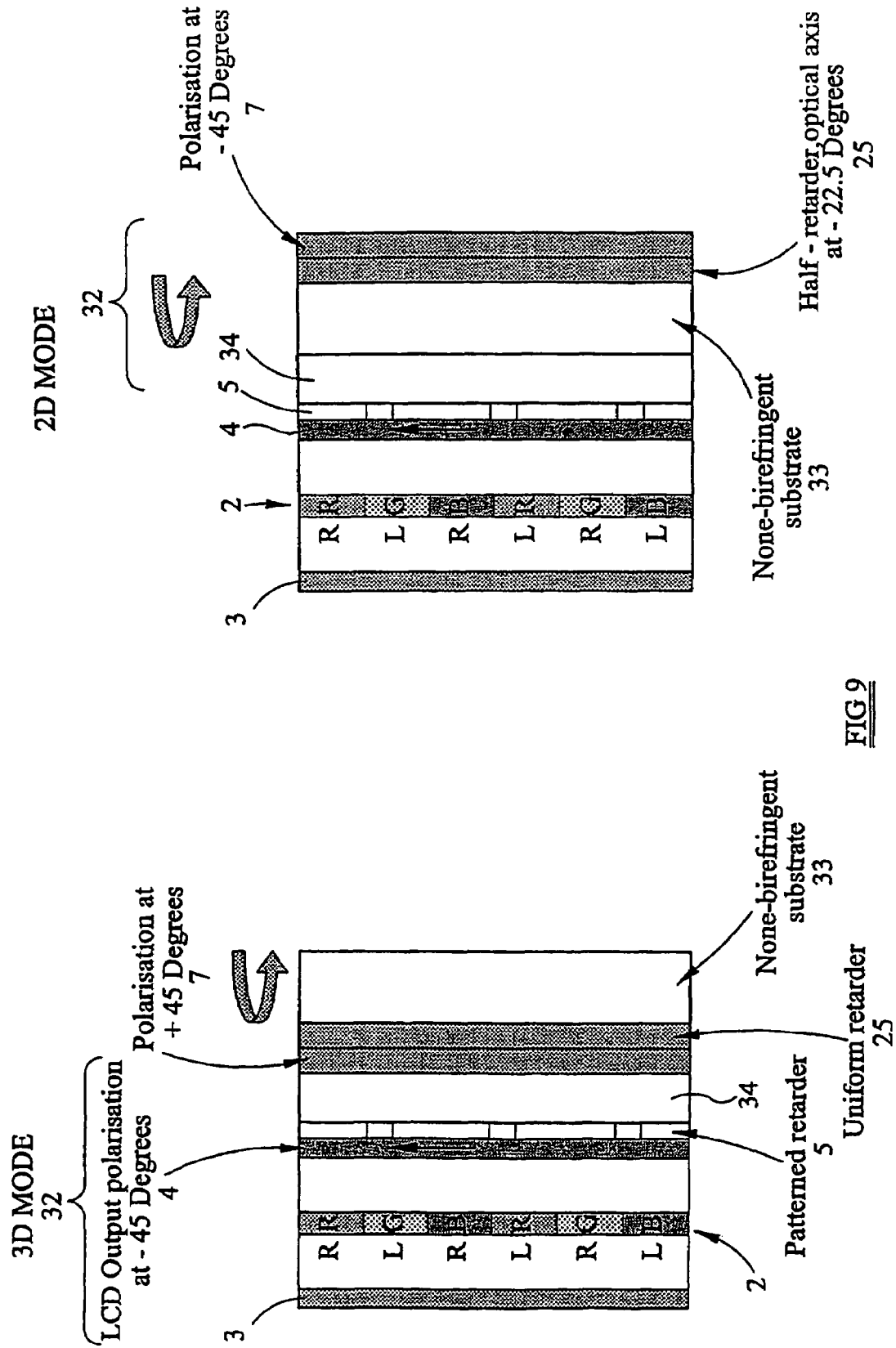
FIG. 9 is a cross sectional diagrammatic view illustrating different physical arrangements of the display of FIG. 7.

FIG. 9 illustrates an arrangement which differs from that shown in FIG. 8 in that the output polariser 7 and the uniform retarder 25 are formed on the same side of the substrate 33. Such an arrangement provides increased protection for the retarder 25 and reduces the need for "hard coating" both sides of the substrate with protective coatings. Anti-reflection coatings may be provided as necessary and are preferably substantially non-birefringent in order to avoid undesirably altering the optical effect of the device.

Figure 10:
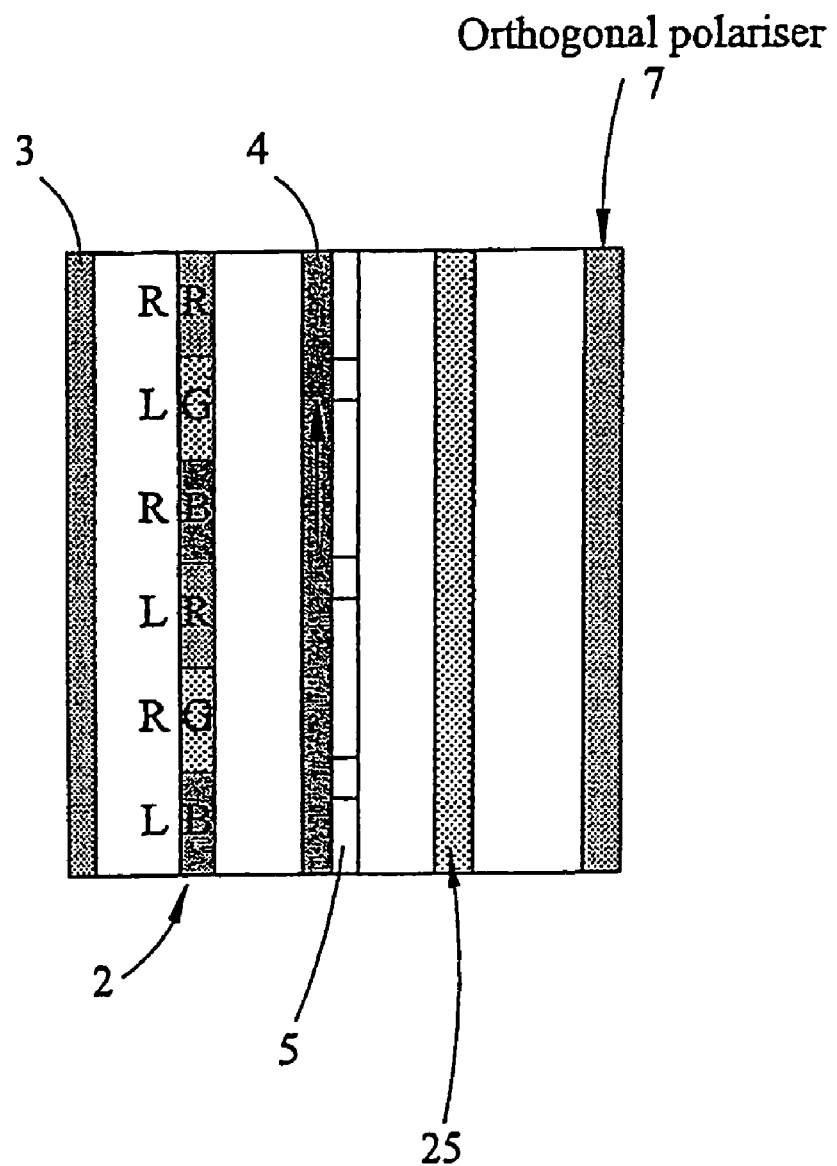
FIG. 10 is a cross sectional diagrammatic view illustrating different physical arrangements of the display of FIG. 7.
Figure 11:
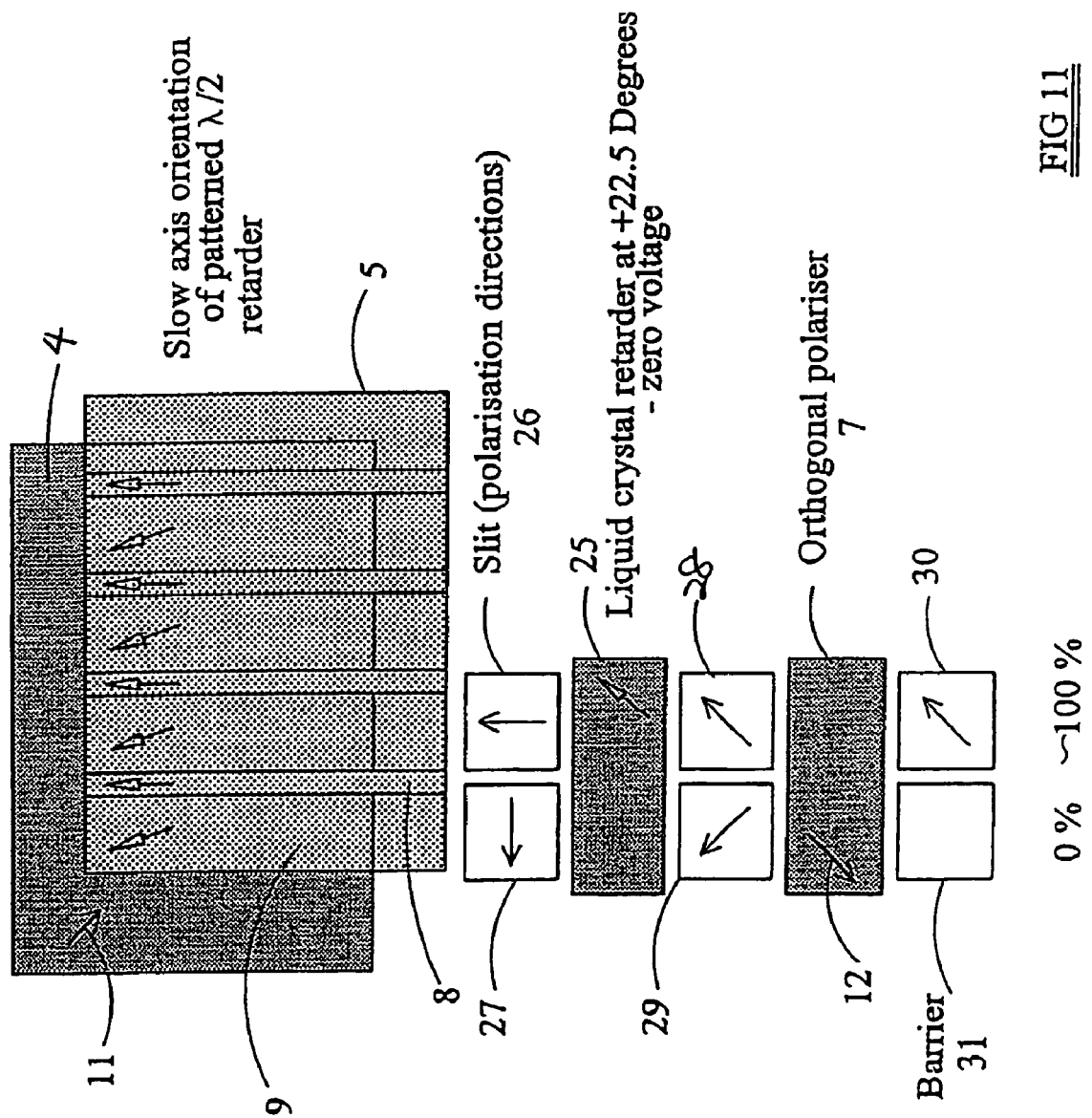
FIG. 11 illustrates diagrammatically an optical device and display constituting a third embodiment of the invention.
Figure 12:
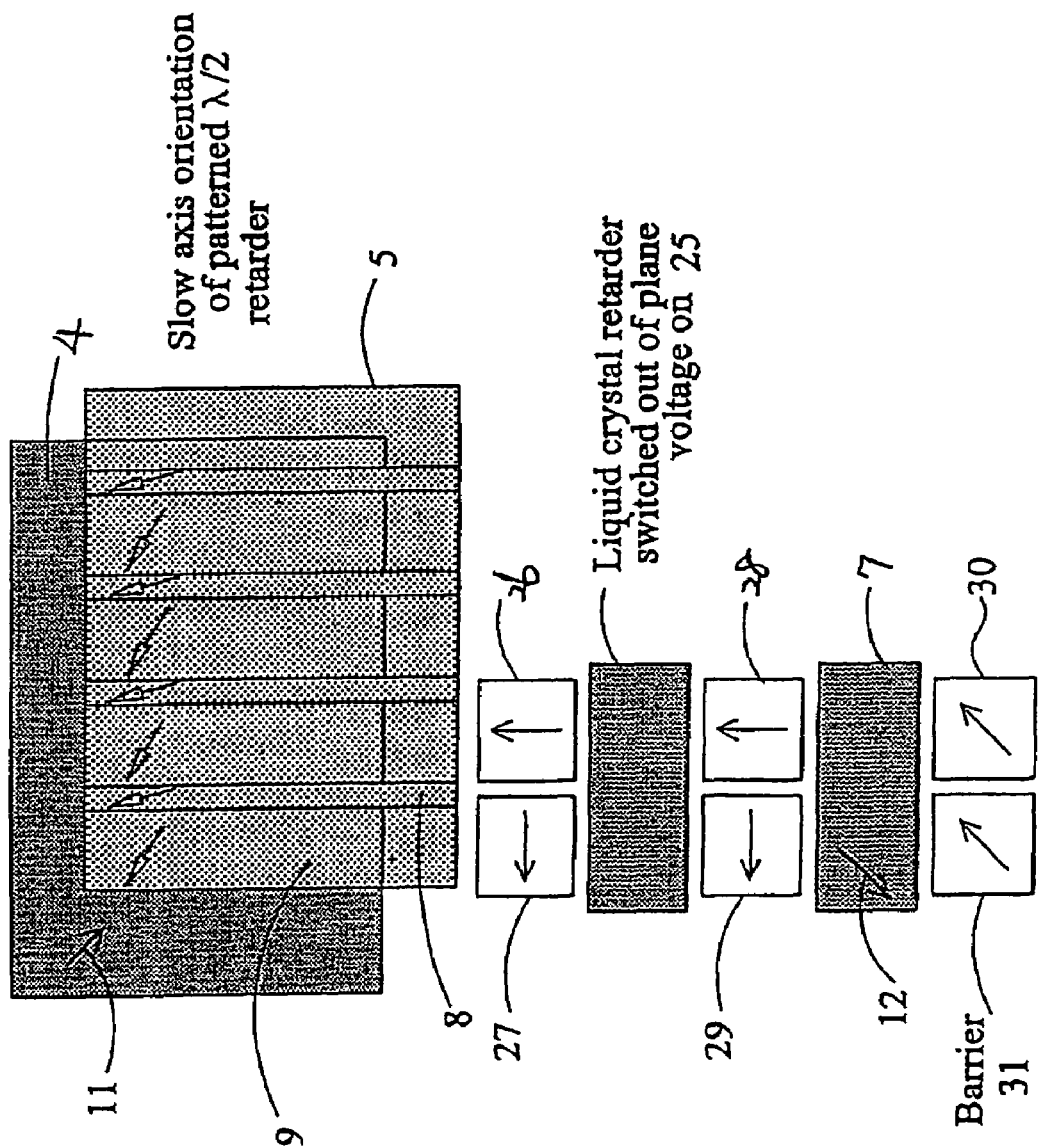
FIG. 12 illustrates diagrammatically a 2D mode of the display of FIG. 11.

FIGS. 10 to 12 illustrate another device and display in which the retarder 25 is embodied as an electrically switchable halfwave retarder for switching between the 2D and 3D modes of operation. The retarder 25 is switchable between a state in which it acts as a halfwave retarder with a slow axis oriented at 22.5° (as shown in FIG. 11 for the 3D autostereoscopic mode) and a state in which it provides substantially zero retardation (as shown in FIG. 12 for the 2D mode). For example, in the 2D mode, the slow axis may be switched to be perpendicular to the plane of the retarder 25 and substantially parallel to the light paths through the device and the display. The switchable retarder 25 may be embodied as a liquid crystal device such as a nematic liquid crystal device of the Freedericksz configuration having anti-parallel alignment. Devices of this type are disclosed in Liquid Crystals, 2002, vol. 29, No. 1, "Criteria for the first order Freedericksz transition", Jianra Shi. In such a device, when a voltage is applied across the liquid crystal layer, the liquid crystal directors, and hence the slow optic axis, lie substantially perpendicular to the plane of the device to present a uniform refractive index, and hence no birefringence, to light passing in the normal direction through the device.

The liquid crystal device may be configured so as to be uniform in either state, in which case the whole display is switchable as a unit between the 2D and 3D modes. Alternatively, suitably patterned electrodes may be provided within the liquid crystal device so that different areas of the display may be configured independently of each other for 2D or 3D operation.

As shown in FIGS. 11 and 12, the slow axes of the regions 8 and 9 of the retarder 5 are oriented at −22.5 and −67.5°, respectively, so as to be symmetrically oriented about the transmission axis 11 of the polariser 4. The transmission axis 12 of the polariser 7 is orthogonal to the transmission axis 11.

In the 3D mode as illustrated in FIG. 11, the retarder 25 is configured with its slow axis at +22.5°. The polarisations 26 and 27 are thus converted into the polarisations 28 and 29. The polariser 7 substantially extinguishes the polarisation 29 from the regions 9 and passes with minimum attenuation the polarisation 28 from the slit regions 8. The optical device thus functions as a parallax barrier.

As shown in FIG. 12, in the 2D mode, the retarder 25 is effectively disabled so that the polarisations 26 and 27 from the regions 8 and 9, respectively, are passed unaltered as shown at 28 and 29, respectively. The polariser 7 thus passes light from the regions 8 and 9 matched for phase, amplitude and polarisation as illustrated at 30 and 31.

In the 3D mode, the retarders 5 and 25 may have substantially matched dispersions. Thus, the presence of orthogonal polarisers 4 and 7 together with retarders of matched dispersions results in good extinction throughout the visible spectrum of light through the regions 9 resulting in good crosstalk performance in the 3D mode. The matched dispersions of the retarders 5 and 25 results in a bright more achromatic performance through the slit regions 8.

Figure 13:
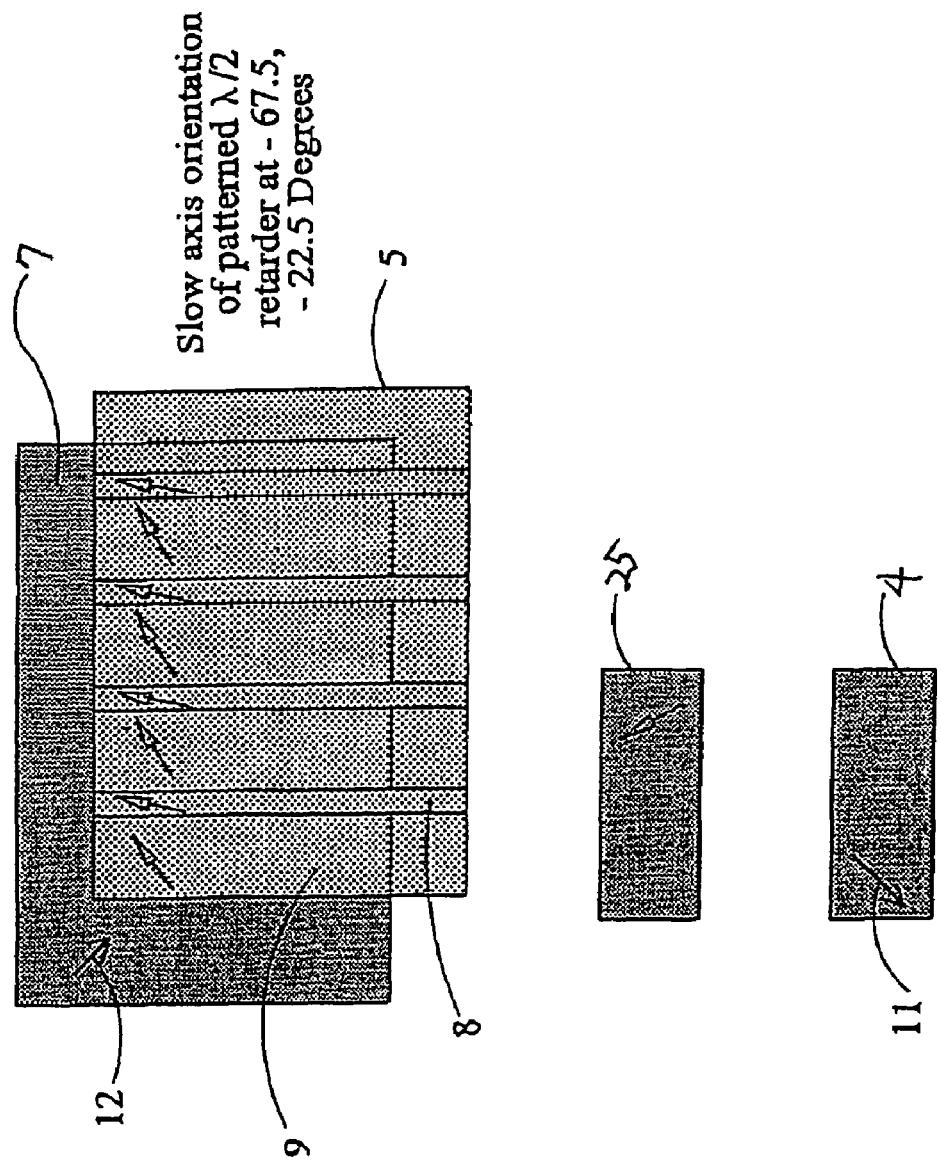
FIG. 13 illustrates diagrammatically an optical device and display constituting a fourth embodiment of the invention.
Figure 14:
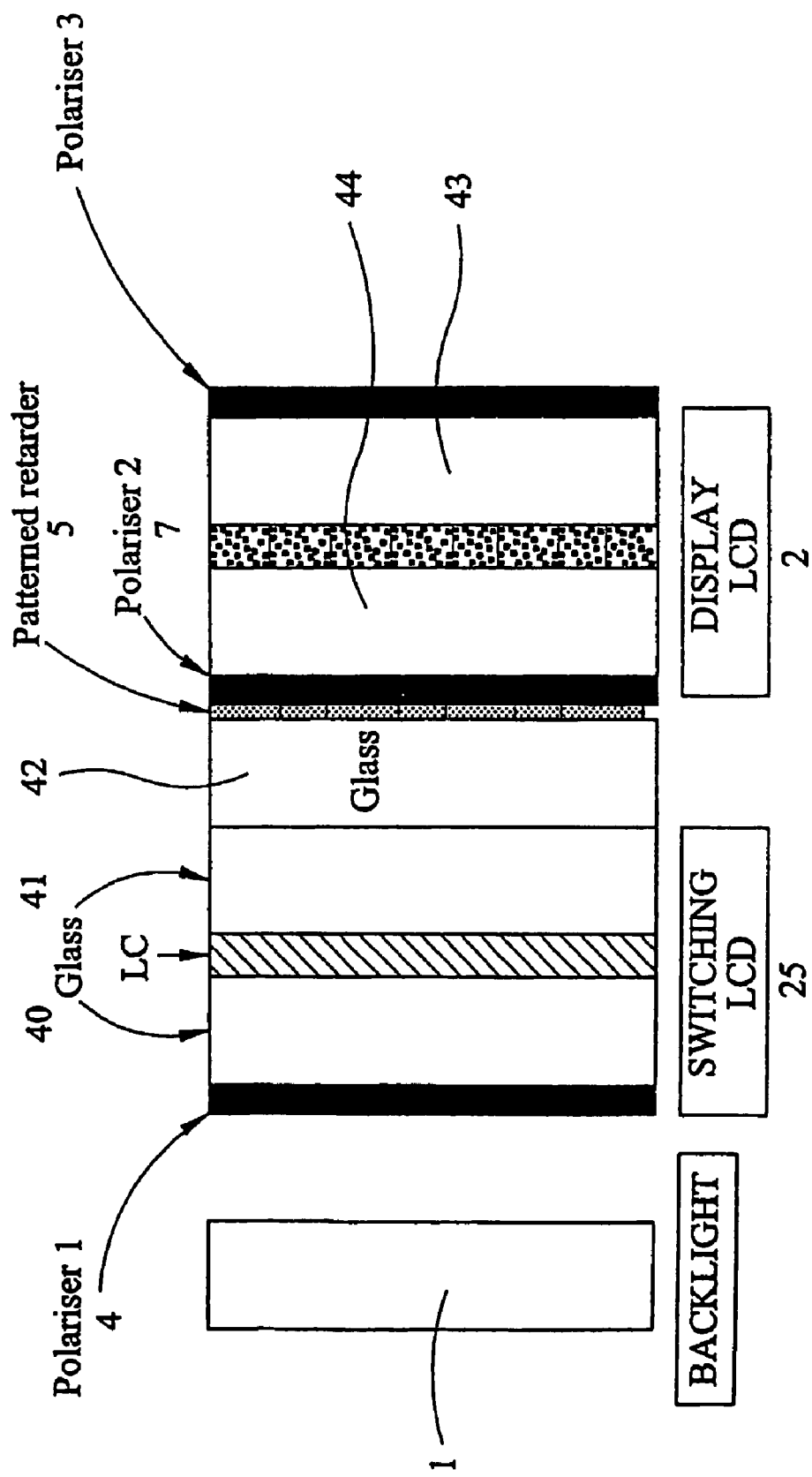
FIG. 14 is a cross sectional diagram illustrating different physical arrangements of the display of FIGS. 11 and 12.

FIG. 13 illustrates a rear parallax barrier display in which the rear parallax barrier is formed by an optical device of the same type as that illustrated in FIGS. 11 and 12. However, in the arrangement shown in FIG. 13, the rear polariser of the LCD becomes the output polariser 7 of the optical device and the input polariser 4 is distinct from the LCD. Also, the switching liquid crystal retarder 25 is disposed ahead of the patterned retarder 5 in the direction of light transmission through the device. This allows the patterned retarder 5, which effectively defines the rear parallax barrier in the 3D mode, to be nearer the display LCD 2 as illustrated in FIG. 14 so as to reduce the distance between the barrier and the display pixels. Reducing this distance allows the best viewing distance in front of the display to be reduced, for example to allow the display to be viewed in hand-held equipment such as mobile telephones and personal digital assistants.

The rear parallax barrier type of display is more suitable for use in transflective displays having both transmissive and reflective modes of operation. By disposing the parallax barrier behind the display LCD 2, attenuation in the reflective mode of light passing through a front parallax barrier twice is substantially eliminated and this allows a brighter reflective mode to be obtained.

As shown in FIG. 14, in the switching LCD 25, the patterned retarder and the display LCD 2 are made as individual devices which are subsequently brought together to form the complete display. Thus, the switching LCD 25 has glass substrates 40 and 41, the patterned retarder 5 is formed on a glass substrate 42, and the display LCD 2 has glass substrates 43 and 44.

Figure 15:
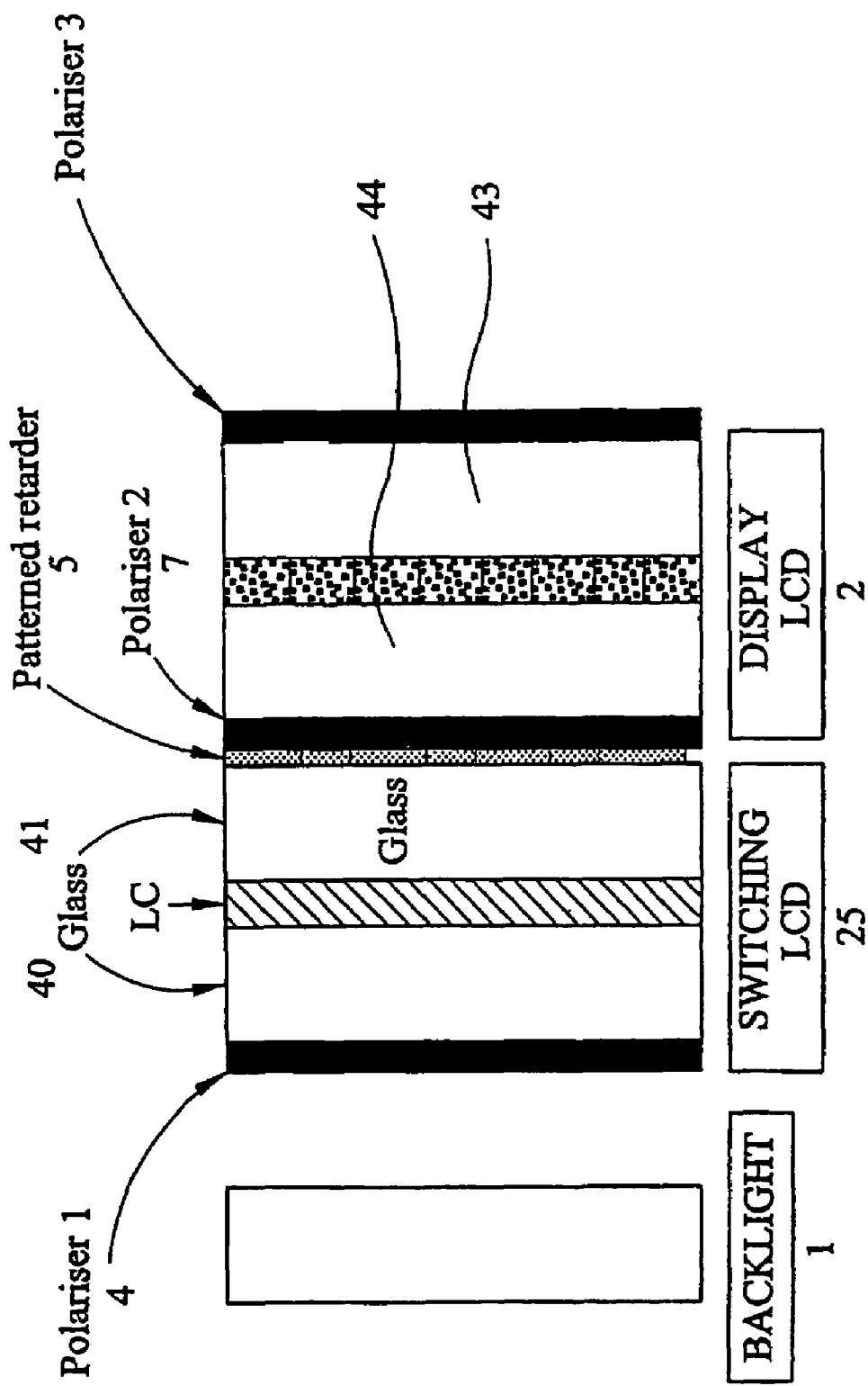
FIG. 15 is a cross sectional diagram illustrating different physical arrangements of the display of FIGS. 11 and 12.

As illustrated in FIG. 15, the substrate 42 can be omitted by forming the patterned retarder on the substrate 41 of the switching LCD 25. A display of reduced thickness may therefore be provided and is advantageous for applications in devices which are required to be relatively thin.

Figure 16:
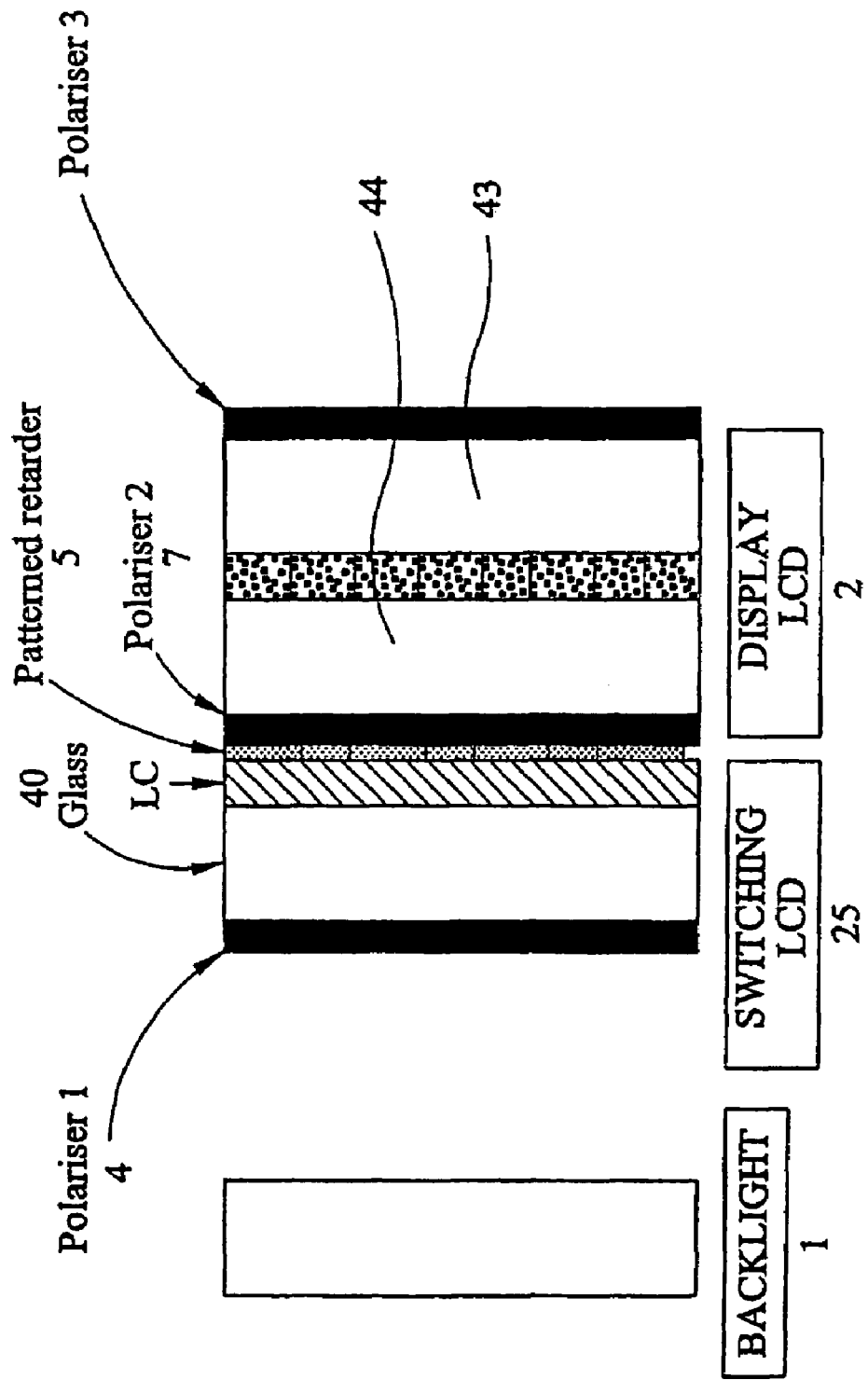
FIG. 16 is a cross sectional diagram illustrating different physical arrangements of the display of FIGS. 11 and 12.

FIG. 16 illustrates a further reduction in thickness by eliminating the substrate 41 and sharing the substrate 44 between the switching LCD 25 and the display LCD 2. In this case, the retarder 5 and the polariser 7 are formed as internal components effectively within the LCD 25. These components, and particularly the polariser 7, must therefore be of a type which is capable of withstanding subsequent temperature and chemical processing to form transparent electrodes and alignment layers for the device 25. Examples which are suitable for this internal application are disclosed in EP 0 887 692 and by Bobrov et al, "Lyotropic thin film polarisers", Proc. SID 2000.

Figure 17:
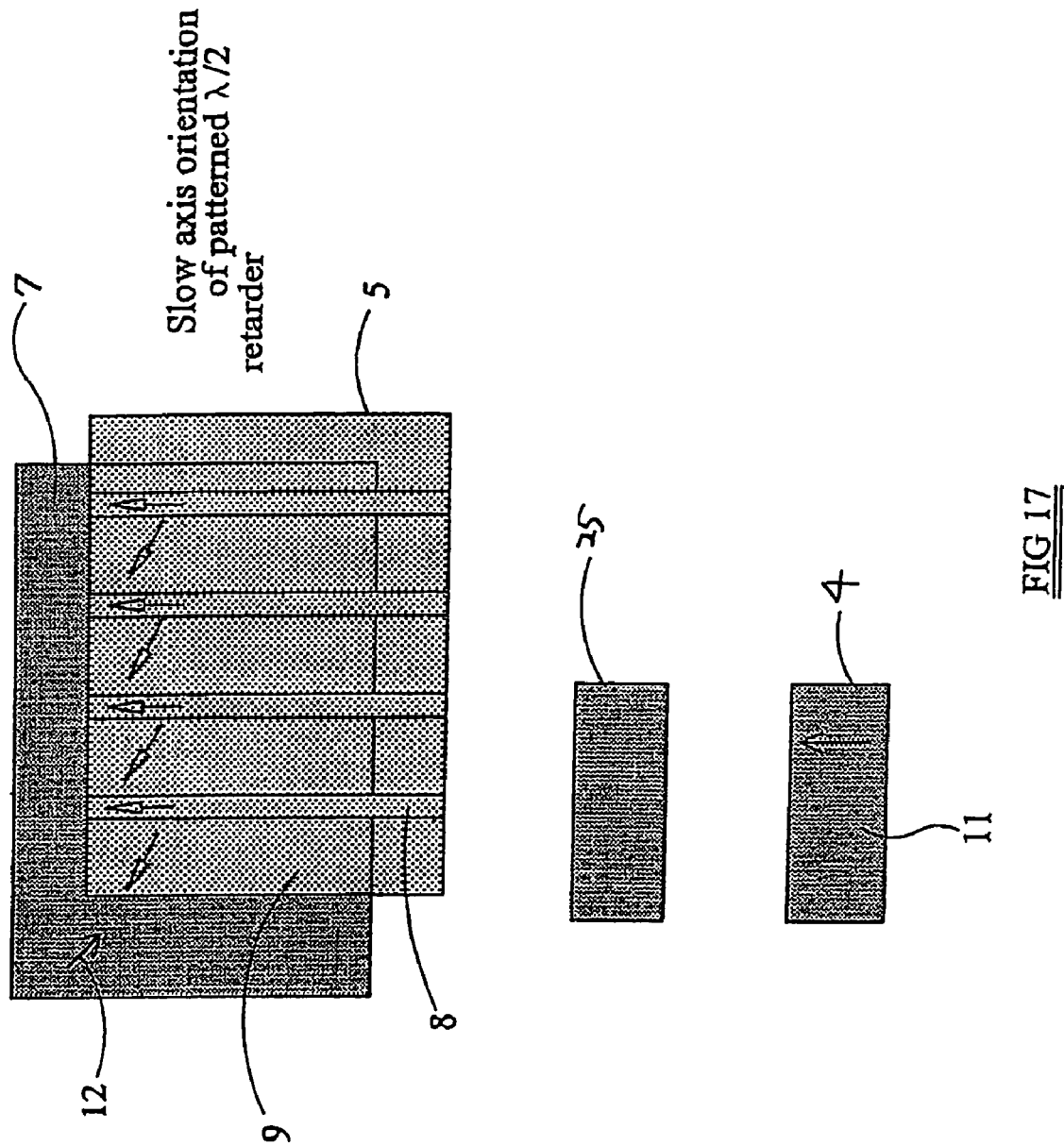
FIG. 17 illustrates diagrammatically an optical device and display constituting a fifth embodiment of the invention.

FIG. 17 illustrates a rear parallax barrier arrangement which differs from that shown in FIG. 13 in that the slow axes of the regions 8 and 9 are oriented at 0° and −45°, the liquid crystal retarder 25 has a slow axis oriented at 22.5° in the 3D mode, and the polariser 4 has a transmission axis 11 oriented at 0°. This configuration provides a more achromatic output in the 2D mode illustrated in FIG. 17 and so reduces errors in colour reproduction.

Figure 18:
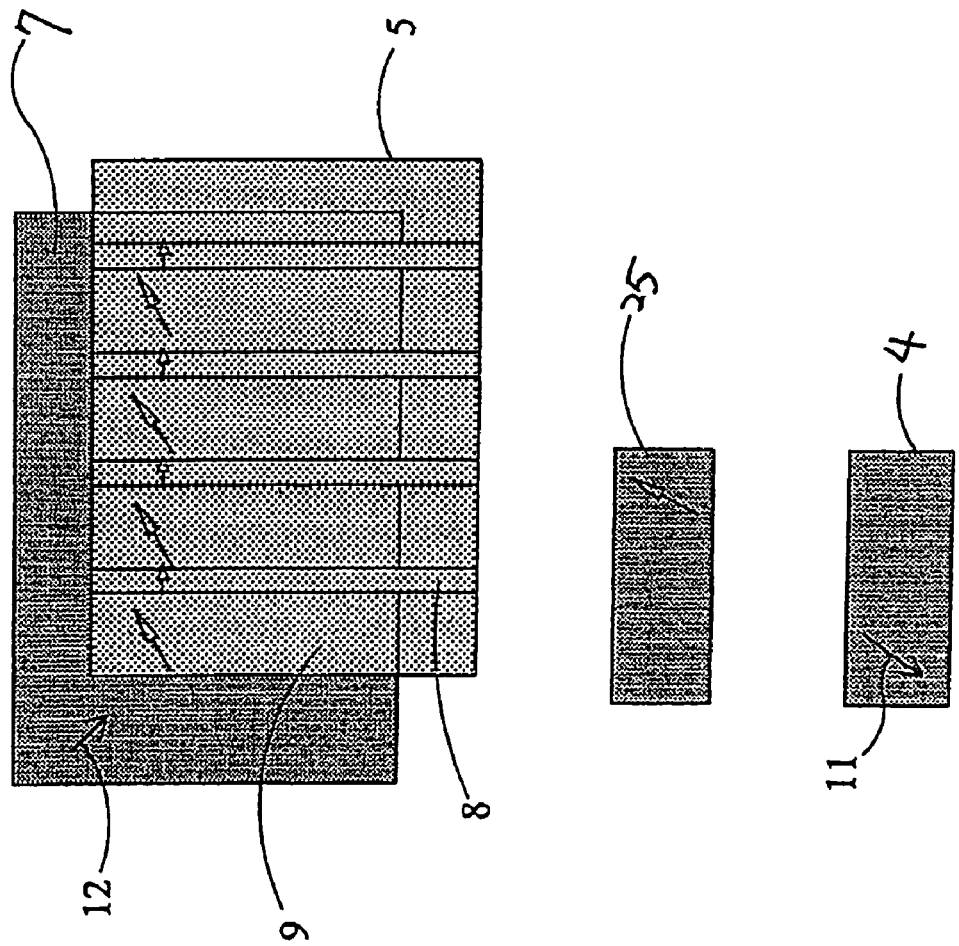
FIG. 18 illustrates diagrammatically an optical device and display constituting a sixth embodiment of the invention.

FIG. 18 illustrates the 2D mode of another rear parallax barrier type of display in which the 2D mode occurs with the liquid crystal retarder 25 switched off. Such an arrangement may be preferable where the 2D mode is expected to be used primarily and power consumption is important, for example in battery powered devices.

In the display of FIG. 18, the axes of the regions 8 and 9 are oriented at 90° and 45°, respectively. In the 2D mode with the liquid crystal retarder 25 switched off, the slow axis of the retarder is oriented at 22.5°. The transmission axis 11 of the polariser 4 is orthogonal to the transmission direction 12 of the polariser 7 and is oriented at 45°. When the liquid crystal retarder 25 is switched on, the retardation is substantially eliminated and the display functions in the autostereoscopic 3D mode.

Figure 19:
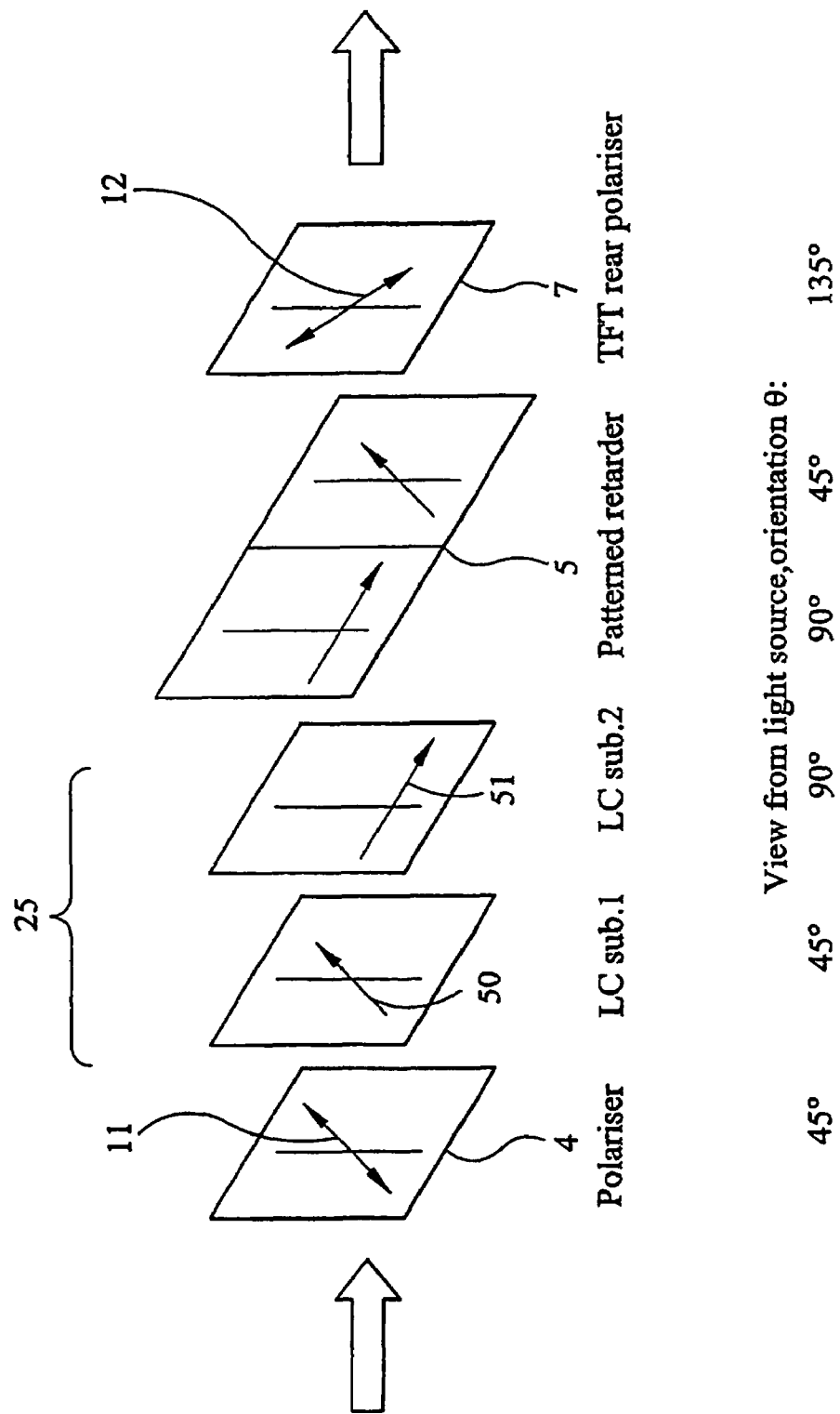
FIG. 19 is a diagram illustrating an optical device and display constituting a seventh embodiment of the invention.

FIG. 19 illustrates another rear parallax barrier display in which the liquid crystal retarder 25 acts as a polarisation rotator to produce a 45° rotation of the polarisation direction of light from the polariser 4. The retarder 25 is a twisted nematic device having a relative angle between alignment directions 50 and 51 at the surfaces of a twisted nematic liquid crystal layer nearer the polariser 4 and the retarder 5, respectively. The alignment direction 50 is illustrated as being parallel to the transmission axis 11 and there is a twist of 45° between the alignment directions 50 and 51. However, the LCD 25 may be oriented at any angle to the transmission axis 11 and will produce a 45° of rotation of the polarisation direction of light passing therethrough.

In the 2D mode, the device 25 provides 45° of polarisation rotation. For operation in the autostereoscopic 3D mode, a voltage is applied across the twisted nematic liquid crystal layer so that the liquid crystal directors are aligned perpendicular to the plane of the device and provide no polarisation rotation.

Figure 20:
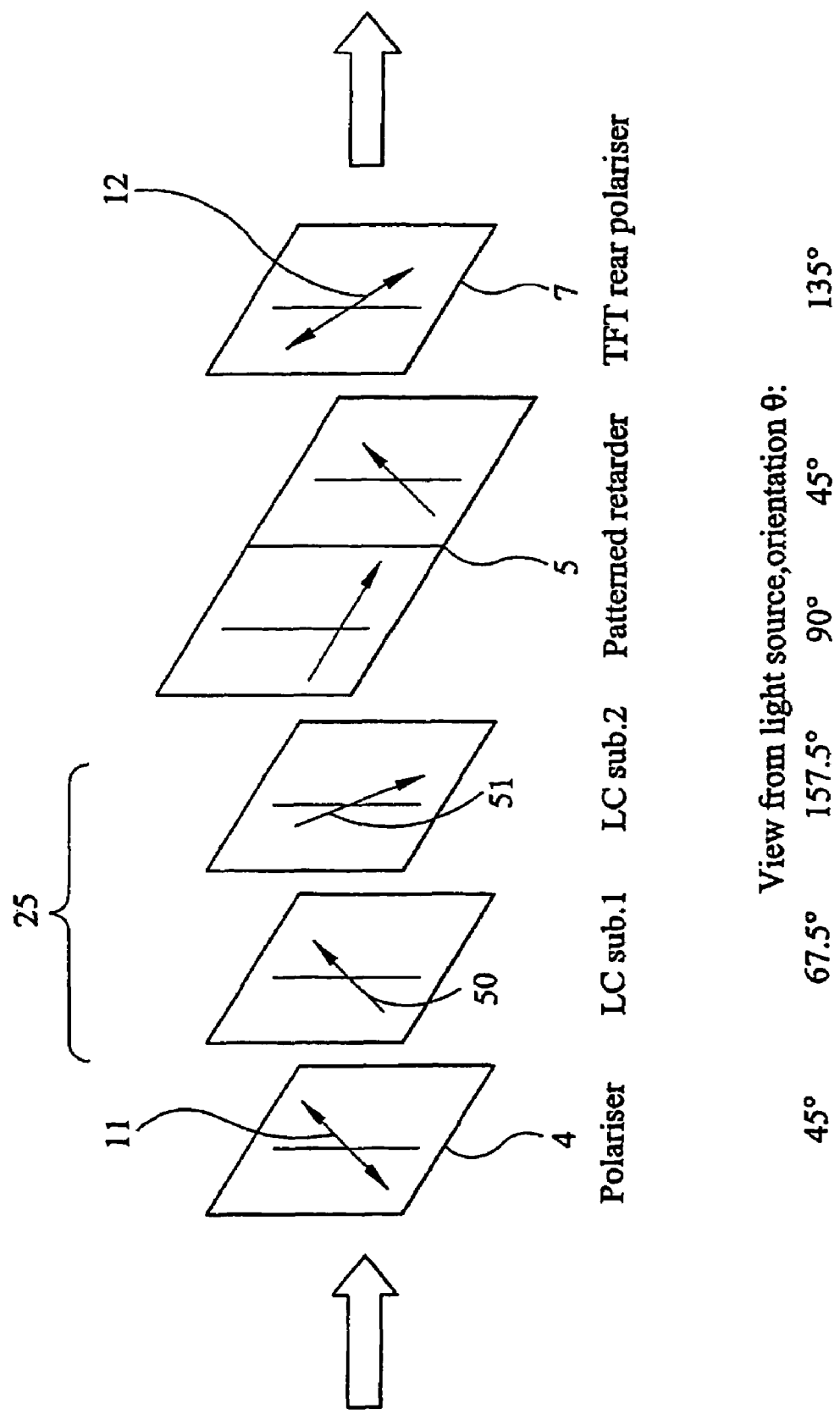
FIG. 20 is a diagram illustrating an optical device and display constituting an eight embodiment of the invention.

The display shown in FIG. 20 differs from that shown in FIG. 19 in that the twist of the device 25 is 90°. Such a device is "self-compensating" and may be operated at a lower voltage. A rotation of 45° is achievable with such a device by the appropriate choice of angles and retardance. A device of this type is disclosed in our British Patent Application No. 0215057.1 (filed on the same day as the present application, entitled "Polarisation Rotator, Parallax Barrier, Display and Optical Modulator", and bearing reference number P52138 GB).

Figure 21:
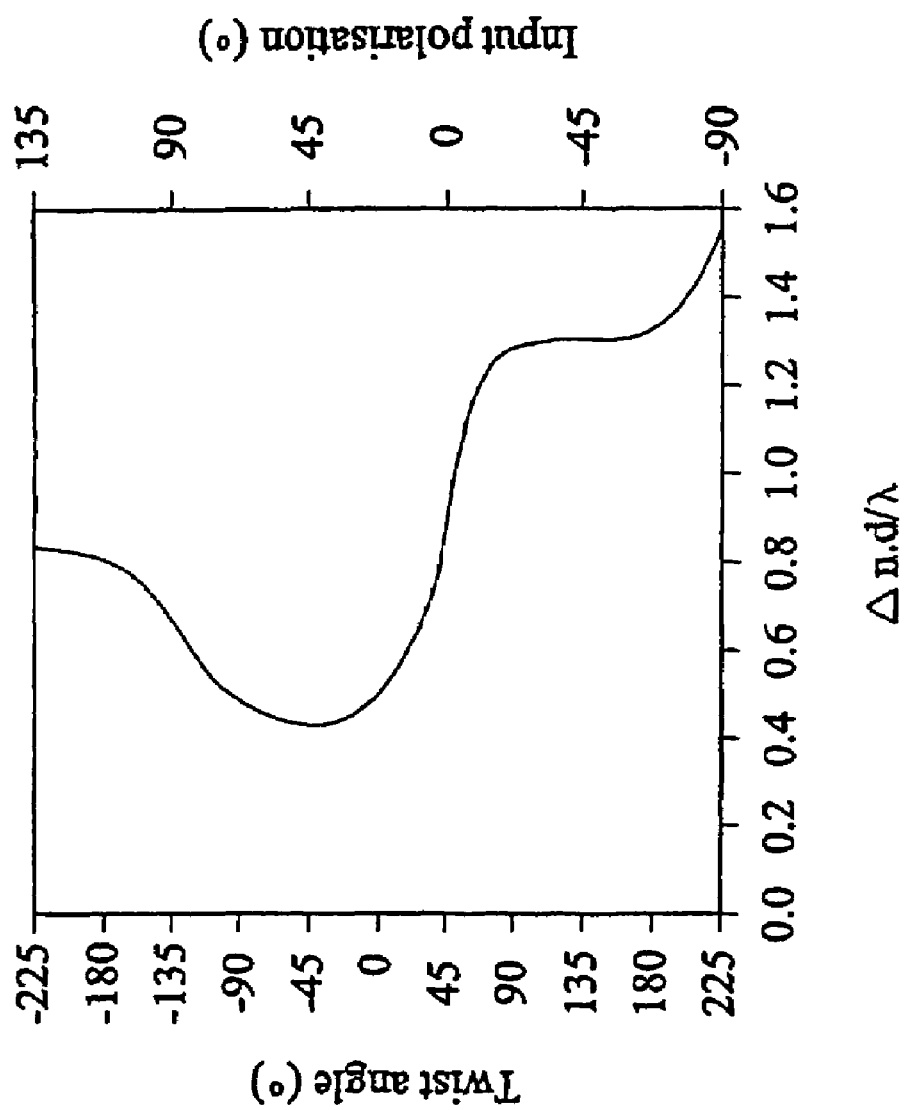
FIG. 21 is a graph illustrating combinations of input polarisations, twist angles and retardations for producing a polarisation rotation of 45°.

For linearly polarised light incident on a twisted nematic liquid crystal, linear polarisation with a polarisation azimuth of any selected value may be obtained with any device twist angle provided the twist ($\phi$), the retardation ($\Delta n \cdot d$) and the orientation of the input director from the polariser ($\theta$) are correctly chosen. For rotation of linearly polarised light by 45° with respect to the incident polarisation, the following equations may be derived by considering the Stokes parameters for linearly polarised light propagating through a twisted nematic structure:

$$\tan(\phi\sqrt{1+\alpha^2}) = \sqrt{1+\alpha^2}$$

$$\alpha = \frac{\Delta n.d \cdot \phi \cdot \pi}{\lambda}$$

where $\lambda$ is the wavelength of the incident light. These equations may be solved numerically to give a set of solutions as illustrated graphically in FIG. 21.

Figure 22:
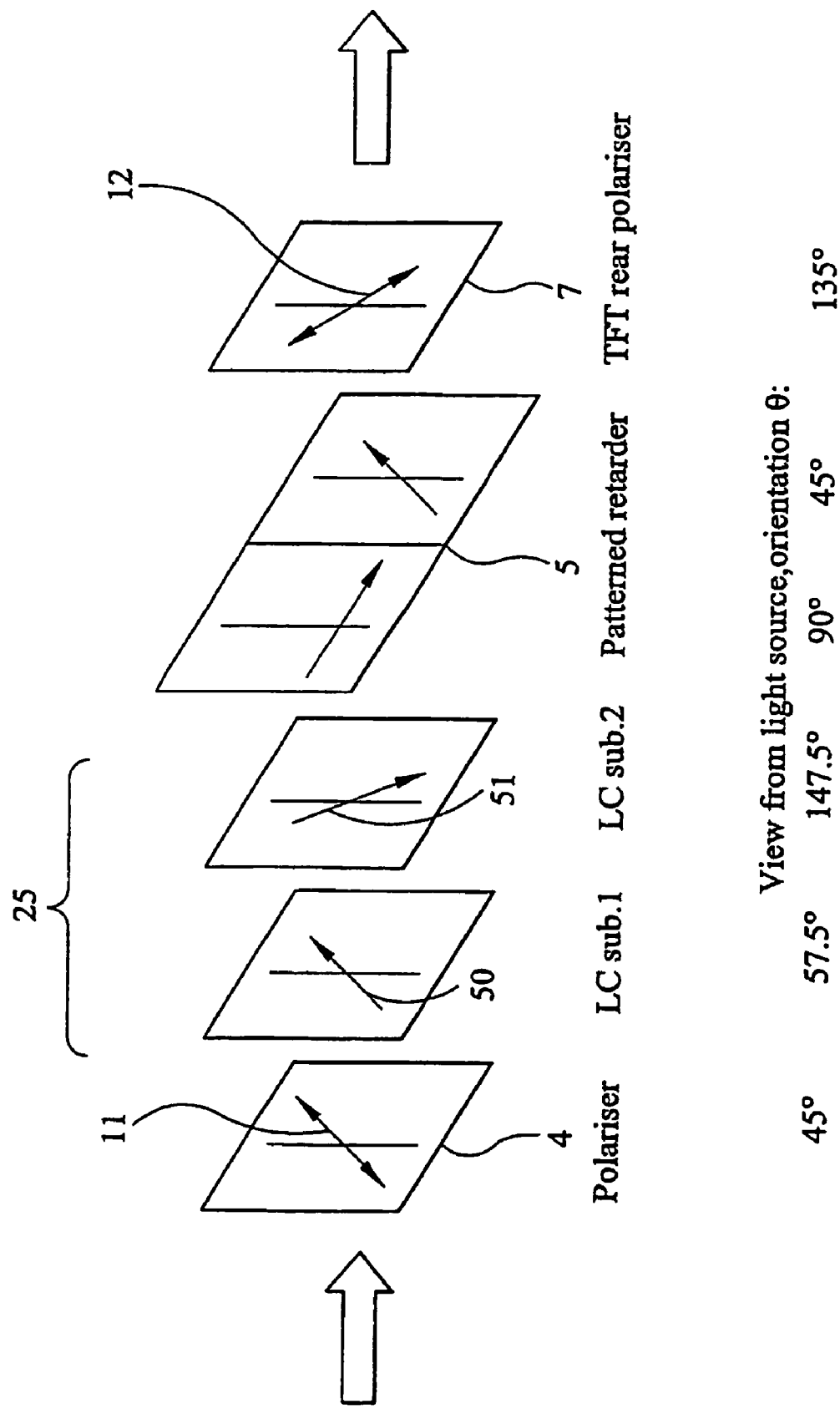
FIG. 22 is a diagram illustrating an optical device and display constituting a ninth embodiment of the invention.

FIG. 22 illustrates an arrangement which differs from that shown in FIG. 20 in that the angles and retardances have been changed so as to optimise performance across the visible spectrum. When a voltage is applied to the liquid crystal layer of the device 25, the device has no optical effect on the system. The retardance and orientation may therefore be optimised for the state in which a polarisation change is required such that the intensity and colour produced through the slit and barrier regions of the patterned retarder 5 are substantially identical.

Figure 23:
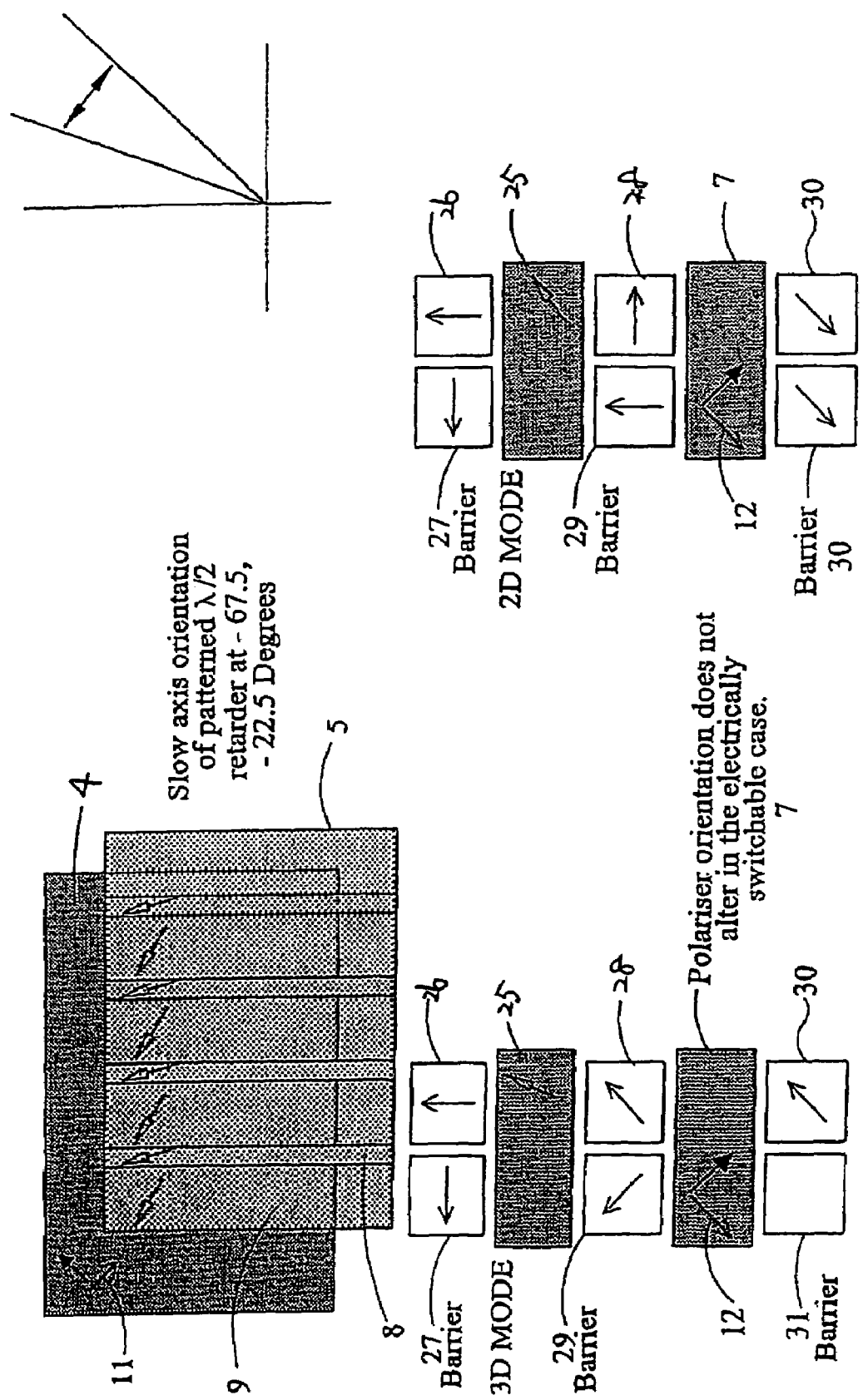
FIG. 23 illustrates diagrammatically an optical device and display constituting a tenth embodiment of the invention.

FIG. 23 illustrates a front parallax barrier display having a switchable retarder 25 in which the slow axis is switched between an orientation of 22.5° in the 3D mode (illustrated at the bottom left of FIG. 23) and an orientation of 45° in the 2D mode (illustrated at the bottom right in FIG. 23). Such a switchable retarder may be embodied as a liquid crystal device of the in-plane switching type, for example a ferroelectric liquid crystal (FLC), (e.g. as disclosed in Clark N. A. and Lagarwell S. T., 1980, Appl. Phys. Lett., 36, 899), an anti ferroelectric liquid crystal (AFLC), or a bistable twisted nematic (BTN) device (e.g. as disclosed in D. W. Berreman and W. R. Heffner, J. Appl. Phys., 52, 3032, 1981) (e.g. as disclosed in Chandani et al, 1989, Jpn. J. Appl. Phys., 28, L1261) The polarisers 4 and 7 and the patterned retarder 5 are arranged as shown in FIG. 12.

Figure 24:
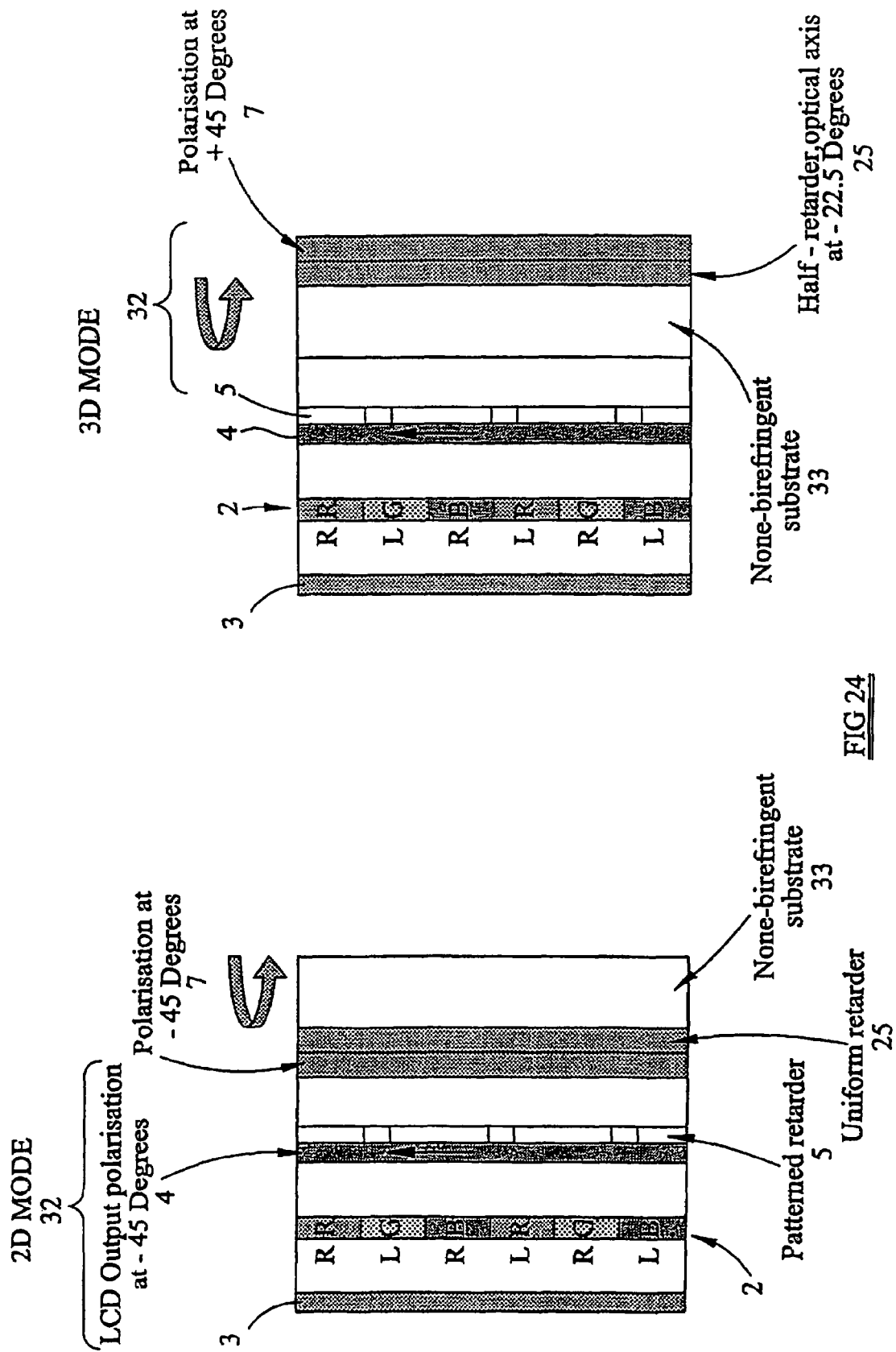
FIG. 24 comprises cross sectional views of the physical arrangements of an optical device and display constituting an eleventh embodiment of the arrangement.

FIG. 24 illustrates a display of a type similar to that shown in FIG. 9 but in which the 3D and 2D modes resemble the electrically switchable display of FIG. 10. The display of FIG. 24 may therefore be considered as a "mechanical analogs" of the display of FIG. 10 in which the switched liquid crystal retarder is replaced, for example, by a fixed sheet retarder.

Figure 25:
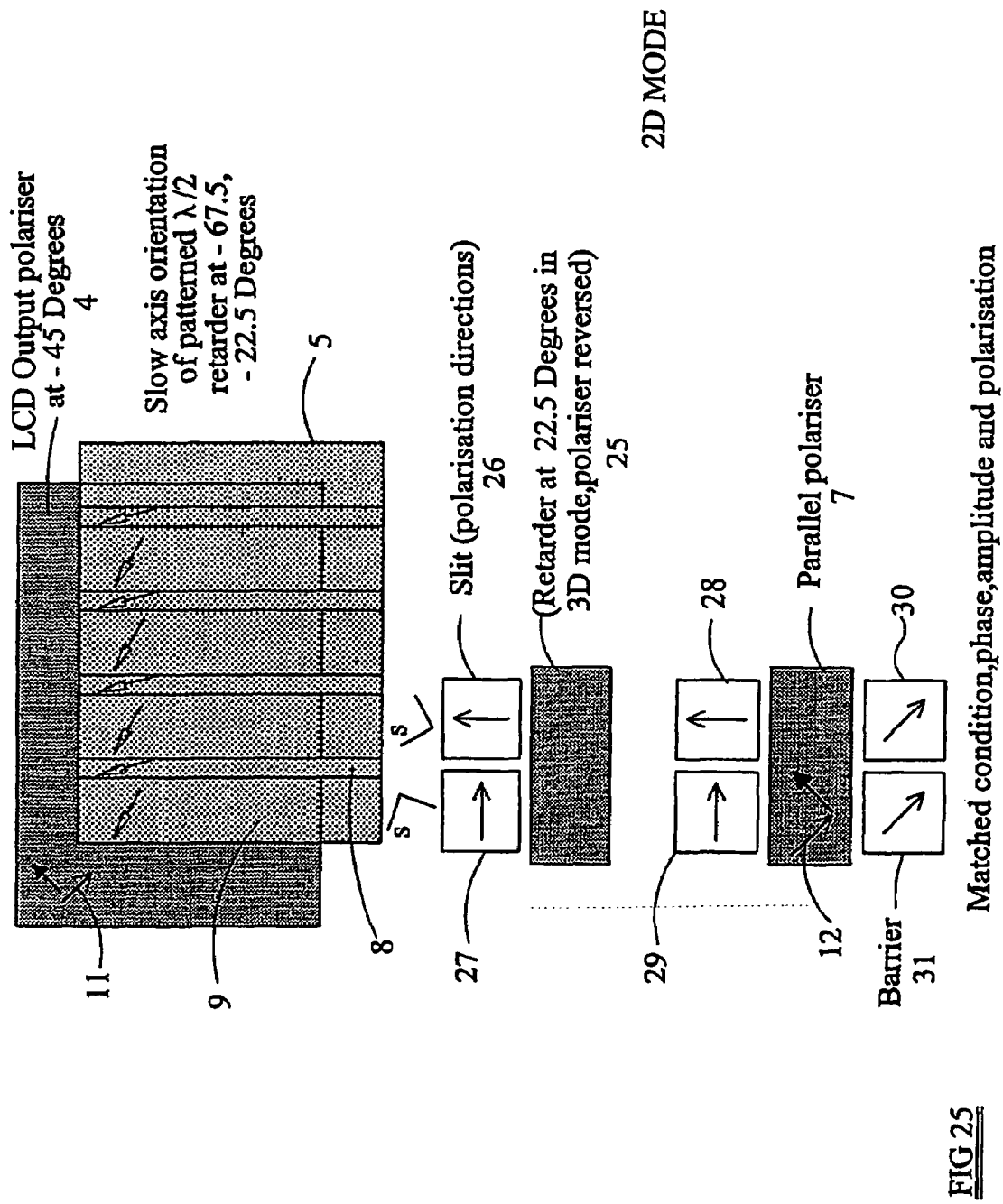
FIG. 25 illustrates diagrammatically an optical device and display constituting a twelfth embodiment of the invention.

FIG. 25 illustrates an arrangement which differs from that of FIG. 12 in that the transmission axis 12 of the polariser 7 is parallel to the transmission axis 11 of the polariser 4. Light from the regions 8 and 9 is matched in phase, amplitude and polarisation.

The other electrically switched embodiments also have mechanical analogues, as will readily be understood by the person skilled in the art. In the case of the switched twisted nematic arrangements, twisted fixed retarder structures may be used. For example, such structures may be used by adding a chiral dopant to a liquid crystal polymer or reactive mesogen material to produce the desired helical structure followed by polymerising.

In contrast to the liquid crystal modes described hereinbefore, out of plane switching (OPS) versions are also possible. OPS modes can either be homogeneously aligned, homeotropically aligned, or hybrid aligned (HAN). The inverse operation of any homogeneously aligned positive dielectric nematic LCD can be obtained (to a good approximation) by using homeotropic alignment and a negative dielectric anisotropy liquid crystal material. Therefore, by changing from one alignment to the other, the unpowered state of the display may be changed between the 2D mode and the 3D mode. HAN LCDs may be used in place of homogeneously aligned nematic LCDs by simply making the thickness twice as large (provided that the twist is 0°) and changing the alignment from homogeneous to homeotropic. The Zenithal Bistable Nematic (ZBN) mode may also be used, and has the advantage of being truly bistable and hence has very low power consumption as power is only required to switch from one state to another. In one state, the ZBN LCD takes up the configuration of a HAN and, in the other, a homeotropically aligned LCD.

All of the optical devices described hereinbefore may be used as front or rear parallax barriers. Also, as mentioned hereinbefore, different areas of the display may simultaneously operate in 2D and 3D modes. For example, FIG. 26 illustrates electrode patterns 55 and 56 on the substrates of an example of a switching LCD 25 to allow different regions to operate simultaneously in different modes. FIG. 26 also illustrates the appearance of the display with upper and lower regions operating in the 2D mode to display text and a middle region operating in the 3D mode to display an image. In such arrangements, it is desirable for the brightness of the different regions to be matched, for example by adjusting the grey scale range used in software.

Throughout the present specification, positive values of angles may be either clockwise or anticlockwise, with negative values then referring to angles in the opposite direction. Also, all angles of polarisation directions and retarder slow axes are expressed "modulo 180°". Thus, each angle θ is equivalent to each angle (θ+n·180)°, where n is any integer. However, in the cases of certain devices, because of the nature of their constructions, a value of θ may be preferred over the value (θ+180°) because of improved performance.

It is thus possible to provide an optical device which is suitable for use in displays. When used, for example, in an autostereoscopic 3D display which also has a 2D mode of operation, such a device substantially reduces or suppresses variations in light intensity across the display in the 2D mode. For example, where the device operates as a parallax barrier in the 3D mode, faint intensity strips, (corresponding to the barrier or slit regions in the 3D mode) are substantially suppressed in the 2D mode so that, as compared with known types of displays, this visual artefact can be removed or reduced to the point where it is not visible to an observer.

Various embodiments permit changes in mode of operation by turning the device around or by totally electronic means. No part of the display need be removed so that there is no need to provide any storage arrangement or complex alignment arrangement for moveable parts. In the case of rotatable parts, alignment with the display can be achieved very easily. Fine resolution electrode patterns for switchable liquid crystal elements are not required. Similarly, sub-pixel alignment of liquid crystal elements to a spatial light modulator is not required.

Achrmaticity of bright and dark states can be improved. This results in reduced crosstalk in the 3D mode of operation.

INDUSTRIAL APPLICABILITY

It is thus possible to provide an optical device which is suitable for use in displays. When used, for example, in an autostereoscopic 3D display which also has a 2D mode of operation, such a device substantially reduces or suppresses variations in light intensity across the display in the 2D mode. For example, where the device operates as a parallax barrier in the 3D mode, faint intensity strips, (corresponding to the barrier or slit regions in the 3D mode) are substantially suppressed in the 2D mode so that, as compared with known types of displays, this visual artefact can be removed or reduced to the point where it is not visible to an observer.

The invention claimed is:

1. An optical device comprising an input polarizer (4) for passing light having a first polarization direction (11), a polarization modifying element (5) for receiving light of the first polarization direction from the input polarizer (4), and an output polarizer (7) for analysing light from the polarization modifying element (5), the polarization modifying element (5) comprising polarization directions of at least first and second sets of regions (8,9) asymmetric with respect to the first polarization direction, each region (8) of the first set changing the polarization of light from the input polarizer (4) to a second polarization direction different from the first polarization direction and each region (9) of the second set supplying light of a third polarization direction different from the second polarization direction to output a non-uniform wavefront, wherein the output polarizer (7) cooperates with the polarization modifying element (5) such that each first light path through each region (8) of the first set and the output polarizer (7) has substantially the same attenuation and phase change to light from the input polarizer (4) as each second light path through each region (9) of the second set and the output polarizer (7) to output a uniform wavefront, the output polarizer (7) is arranged to transmit only the slow axis component of light from the first and second sets of regions (8,9), and the polarization modifying element (5) comprises a patterned retarder, and wherein the output polarizer (7) is arranged to transmit equal proportions of slow and fast axis components of light from each of the first and second sets of regions (8,9).

2. A device as claimed in claim 1, wherein the regions (8,9) of the first and second sets are interleaved and comprise first and second parallel strips, respectively.

3. A device as claimed in claim 2, wherein the first strips (8) have a first width and the second strips (9) have a second width greater than the first width.

4. A device as claimed in claim 1, wherein the second and third polarization directions are substantially orthogonal.

5. A device as claimed in claim 1, wherein the third polarization direction is the same as the first polarization direction.

6. A device as claimed in claim 1, and having an alternative mode of operation in which the output polarizer (7) is arranged to pass light from the regions (8) of one of the first and second sets and to attenuate light from the regions (9) of the other of the first and second sets.

7. A device as claimed in claim 6, wherein the one of the first and second sets is the first set.

8. A device as claimed in claim 6, wherein the output polarizer (7) is arranged substantially to block light from the other (9) of the first and second sets in the alternative mode.

9. A device as claimed in claim 1, wherein the retarder (5) comprises a photo-polymerised polymer.

10. A device as claimed in claim 1, wherein the retarder (5) provides a half wave of retardation at a visible light frequency.

11. A device as claimed in claim 10, wherein the slow axis of each region (8) of the first set is oriented at 45° to the first polarization direction and the slow axis of each region (9) of the second set is parallel to the first polarization direction.

12. A device as claimed in claim 11, wherein the output polarizer (7) transmits light having a polarization direction oriented at 45° to the first polarization direction.

13. A device as claimed in claim 12, and having an alternative mode of operation in which the output polarizer (7) is arranged to pass light from the regions (8) of one of the first and second sets and to attenuate light from the regions (9) of the other of the first and second sets, wherein the output polarizer (7) is arranged substantially to block light from the other (9) of the first and second sets in the alternative mode, and wherein the output polarizer (7) is flipped by 180° in the alternative mode so as to transmit light having a polarization direction substantially orthogonal to the first polarization direction.

14. A device as claimed in claim 10, wherein the slow axis of each region (8) of the first set is oriented at 22.5° to the first polarization direction and the slow axis of each region (9) of the second set is oriented at −22.5° to the first polarization direction.

15. A device as claimed in claim 10, wherein the slow axis of each region (8) of the first set is parallel to the first polarization direction and the slow axis of each region (9) of the second set is oriented at 45° to the first polarization direction.

16. A device as claimed in claim 1, and comprising a further polarization modifying element (25) between the input and the output polarizers.

17. A device as claimed in claim 16, wherein the further element (25) is a further retarder.

18. A device as claimed in claim 17, wherein the further retarder (25) provides a half wave of retardation at a visible light frequency.

19. A device as claimed in claim 18, wherein the further retarder (25) is a liquid crystal device.

20. A device as claimed in claim 18, wherein the retarder (5) provides a half wave of retardation at a visible light frequency, wherein the slow axis of each region (8) of the first set is oriented at 45° to the first polarization direction and the slow axis of each region (9) of the second set is parallel to the first polarization direction, and wherein the further retarder (25) has a slow axis oriented at 22.50° to the first polarization direction.

21. A device as claimed in claim 20, wherein the output polarizer (7) transmits light having a polarization direction parallel to the first polarization direction.

22. A device as claimed in claim 21, wherein the output polarizer (7) is arranged substantially to block light from the other (9) of the first and second sets in the alternative mode, and wherein the further retarder (25) and the output polarizer (7) are rotatable as a unit through 180° about an axis parallel to the slow axis of each region (8) of the first set for the alternative mode.

23. A device as claimed in claim 19, wherein the further retarder (25) comprises at least one region whose slow axis is switchable between a first orientation substantially parallel to the first and second light paths and a second orientation substantially perpendicular to the first orientation.

24. A device as claimed in claim 23, wherein the further retarder (25) is a Freedericksz cell.

25. A device as claimed in claim 23, wherein the output polarizer (7) is arranged substantially to block light from the other (9) of the first and second sets in the alternative mode, wherein the slow axis of each region (8) of the first set is oriented at 45° to the first polarization direction and the slow axis of each region (9) of the second set is parallel to the first polarization direction, and wherein the first orientation is for the alternative mode, the second orientation is oriented at 22.5° to the first polarization direction, and the output polarizer (7) transmits light having a polarization direction perpendicular to the first polarization direction.

26. A device as claimed in claim 23, wherein the slow axis of each region (8) of the first set is oriented at 22.5° to the first polarization direction and the slow axis of each region (9) of the second set is oriented at −22.5° to the first polarization direction, and comprising a further polarization modifying element (25) between the input and the output polarizers, and wherein the second orientation is for the alternative mode and is oriented at 67.5° to the first polarization direction and the output polarizer (7) transmits light having a polarization direction perpendicular to the first polarization direction.

27. A device as claimed in claim 23, wherein the output polarizer (7) is arranged substantially to block light from the other (9) of the first and second sets in the alternative mode, that wherein the slow axis of each region (8) of the first set is parallel to the first polarization direction and the slow axis of each region (9) of the second set is oriented at 45° to the first polarization direction, and characterised in that wherein the second orientation is for the alternative mode and is oriented at 22.5° to the first polarization direction and the output polarizer (7) transmits light having a polarization direction oriented at 45° to the first polarization direction.

28. A device as claimed in claim 18, wherein the further retarder (25) comprises at least one region whose slow axis is switchable between third and fourth orientations substantially perpendicular to the first and second light paths.

29. A device as claimed in claim 28, wherein the output polarizer (7) is arranged substantially to block light from the other (9) of the first and second sets in the alternative mode, wherein the slow axis of each region (8) of the first set is oriented at 22.50° to the first polarization direction and the slow axis of each region (9) of the second set is oriented at −22.5° to the first polarization direction, and wherein the third orientation is perpendicular to the first polarization direction and the fourth orientation is for the alternative mode and is oriented at 67.5° to the first polarization direction.

30. A device as claimed in claim 16, wherein the further element (25) is a polarization rotator.

31. A device as claimed in claim 30, wherein the slow axis of the or each region (8) of the first set is oriented at 45° to the first polarization direction and the slow axis of the or each region (9) of the second set is parallel to the first polarization direction, and wherein the rotator (25) comprises at least one region which provides a polarization rotation of 45°.

32. A device as claimed in claim 31, wherein the rotator (25) comprises a twisted nematic liquid crystal device.

33. A device as claimed in claim 32, wherein the liquid crystal device (25) has an alignment direction (50), at a liquid crystal surface nearer the input polarizer (4), parallel to the first polarization direction and an alignment direction (51), at a liquid crystal surface nearer the output polarizer (7), oriented at 45° to the first polarization direction.

34. A device as claimed in claim 32, wherein the liquid crystal device (25) has an alignment direction (50), at a liquid crystal surface nearer the input polarizer (4), oriented at 22.5° to the first polarization direction and an alignment direction (51), at a liquid crystal surface nearer the output polarizer (7), oriented at 112.5° to the first polarization direction.

35. A device as claimed in claim 32, wherein the liquid crystal device (25) has an alignment direction (50), at a liquid crystal surface nearer the input polarizer (4), oriented at 12.5° to the first polarization direction and an alignment direction (51), at a liquid crystal surface nearer the output polarizer (7), oriented at 102.5° to the first polarization direction.

36. A device as claimed in claim 30, wherein the output polarizer (7) is arranged substantially to block light from the other (9) of the first and second sets in the alternative mode, and wherein the polarization rotator (25) is disableable for the alternative mode.

37. A display comprising a device as claimed in claim 1.

38. A display as claimed in claim 37, comprising a spatial light modulator (2).

39. A display as claimed in claim 38, wherein the modulator (2) is a liquid crystal spatial light modulator.

40. A display as claimed claim 37, having an autostereoscopic mode.

41. A display as claimed in claim 40, wherein the output polarizer (7) is arranged substantially to block light from the other (9) of the first and second sets in the alternative mode, and wherein the device (25) when in the alternative mode forms a front or rear parallax barrier.

* * * * *